(12) United States Patent
Przybylski

(10) Patent No.: US 9,798,336 B2
(45) Date of Patent: Oct. 24, 2017

(54) BUILDING MANAGEMENT SYSTEM WITH LINKED THERMODYNAMIC MODELS FOR HVAC EQUIPMENT

(71) Applicant: Johnson Controls Technology Company, Holland, MI (US)

(72) Inventor: Andrew J. Przybylski, Franksville, WI (US)

(73) Assignee: Johnson Controls Technology Company, Milwaukee, WI (US)

(*) Notice: Subject to any disclaimer, the term of this patent is extended or adjusted under 35 U.S.C. 154(b) by 372 days.

(21) Appl. No.: 14/694,675

(22) Filed: Apr. 23, 2015

(65) Prior Publication Data
US 2016/0313752 A1 Oct. 27, 2016

(51) Int. Cl.
G05B 13/00 (2006.01)
G05B 15/00 (2006.01)
G05B 21/00 (2006.01)
G05D 23/00 (2006.01)
G05D 23/19 (2006.01)
G05B 15/02 (2006.01)
F24F 3/044 (2006.01)
F24F 11/00 (2006.01)

(52) U.S. Cl.
CPC ......... G05D 23/1917 (2013.01); G05B 15/02 (2013.01); F24F 3/044 (2013.01); F24F 11/0009 (2013.01)

(58) Field of Classification Search
CPC ...... G05D 23/1917; G05B 15/02; F24F 3/044
See application file for complete search history.

(56) References Cited

U.S. PATENT DOCUMENTS

| 7,664,574 | B2 | 2/2010 | Imhof et al. |
| 2011/0055748 | A1 | 3/2011 | Vacariuc |
| 2011/0071685 | A1 | 3/2011 | Huneycutt et al. |
| 2011/0077779 | A1* | 3/2011 | Fuller .................. G05B 15/02 700/276 |
| 2011/0087988 | A1 | 4/2011 | Ray et al. |
| 2011/0088000 | A1 | 4/2011 | MacKay |

* cited by examiner

*Primary Examiner* — Mark Connolly
(74) *Attorney, Agent, or Firm* — Foley & Lardner LLP

(57) ABSTRACT

A building management system (BMS) includes one or more sensors that measure a variable state or condition in the BMS and a plurality of BMS devices that operate to affect the variable state or condition measured by the one or more sensors. Each of the BMS devices stores a thermodynamic block that models the BMS device. Each of the thermodynamic blocks includes a list of connections and a list of stats. The connections define one or more inputs to the thermodynamic block and one or more outputs from the thermodynamic block. The stats define one or more relationships between the inputs and the outputs. Each of the BMS devices includes a solver configured to perform calculations using the stats and connections defined by the thermodynamic block stored within the BMS device.

20 Claims, 14 Drawing Sheets

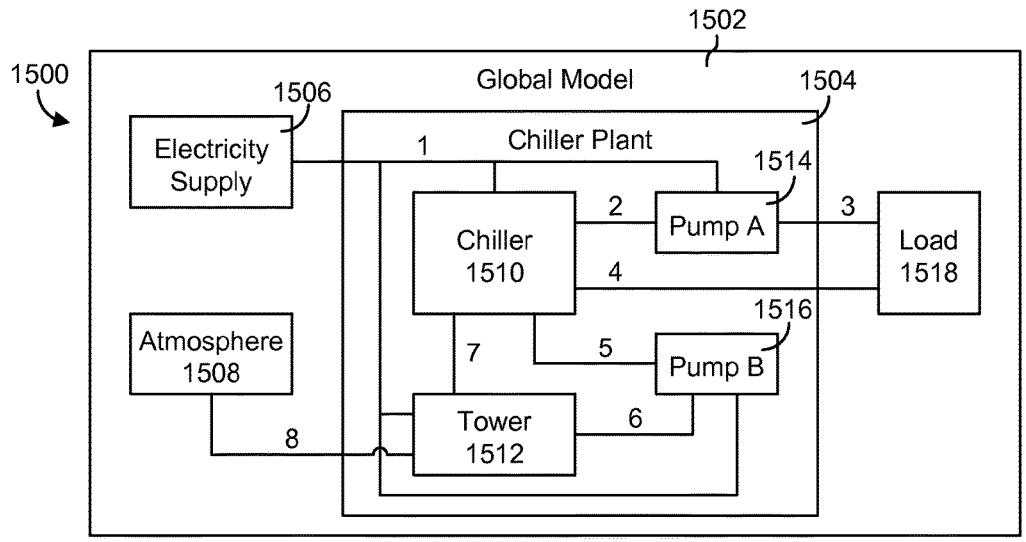

BUILDING MANAGEMENT SYSTEM WITH LINKED THERMODYNAMIC MODELS FOR HVAC EQUIPMENT

BACKGROUND

The present invention relates generally to building management systems. The present invention relates more particularly to a building management system which uses thermodynamic models for HVAC equipment.

A building management system (BMS) is, in general, a system of devices configured to control, monitor, and manage equipment in or around a building or building area. A BMS can include a heating, ventilation, or air conditioning (HVAC) system, a security system, a lighting system, a fire alerting system, another system that is capable of managing building functions or devices, or any combination thereof.

Typical BMSs use point-based models to represent data captured and stored by the BMS. Point-based models represent a facility as a collection of points and often require considerable commissioning time to properly define and configure each of the points. Some point-based models use look-up tables to store definitions for the data points and often lack sufficient definition to provide meaning to the data points. The architecture of conventional point-based models typically provides minimal extractable information upon which advanced control strategies can be based. Additionally, some point-based models require closed control loops to function properly and have a high capital cost with minimal scalability. It would be desirable to provide a BMS with a different type of data model to overcome these and other drawbacks of conventional point-based models.

SUMMARY

One implementation of the present disclosure is a building management system (BMS) including one or more sensors that measure a variable state or condition in the building management system and a plurality of BMS devices that operate to affect the variable state or condition measured by the one or more sensors. Each of the BMS devices stores a thermodynamic block that models the BMS device. Each of the thermodynamic blocks includes a list of connections and a list of stats. The connections define one or more inputs to the thermodynamic block and one or more outputs from the thermodynamic block. The stats define one or more relationships between the inputs and the outputs. Each of the BMS devices includes a solver configured to perform calculations using the stats and connections defined by the thermodynamic block stored within the BMS device.

In some embodiments, the plurality of BMS devices include a plurality of atomic BMS devices including lowest level equipment in the building management system. The plurality of BMS devices may further include a controller that operates to control a subsystem including the plurality of atomic BMS devices.

In some embodiments, each of the atomic BMS devices stores an atomic thermodynamic block that represents the atomic BMS device and models a performance of the atomic BMS device. In some embodiments, the controller stores a non-atomic thermodynamic block that represents the subsystem including the plurality of atomic BMS devices and models a performance of the subsystem.

In some embodiments, the non-atomic thermodynamic block encompasses each of the atomic thermodynamic blocks. The controller may be configured to calculate an output from the non-atomic thermodynamic block by summing one or more outputs from the atomic thermodynamic blocks.

In some embodiments, the controller is configured to request the atomic thermodynamic blocks from the plurality of atomic BMS devices. The plurality of atomic BMS devices may be configured to send the atomic thermodynamic blocks to the controller in response to the request. The controller may be configured to update the non-atomic thermodynamic block stored within the controller using the atomic thermodynamic blocks received from the plurality of atomic BMS devices.

In some embodiments, wherein the solver is configured to access the list of connections and the list of stats provided by a thermodynamic block and identify one or more time series data inputs defined by the list of connections. The time series data inputs may be measured by the one or more sensors. The solver may identify one or more functions, defined by the list of stats, that use the identified time series data inputs. In some embodiments, the solver calculates one or more virtual data points not measured by the one or more sensors by applying the identified functions to the identified time series data inputs.

In some embodiments, the solver is configured to access the list of connections and the list of stats provided by a thermodynamic block and identify one or more data inputs defined by the list of connections. The identified data inputs may be projected future data inputs. The solver may identify one or more functions, defined by the list of stats, that use the projected future data inputs. In some embodiments, the solver simulates a future performance of the building management system by applying the identified functions to projected future data inputs.

In some embodiments, the solver is configured to identify one or more sub-blocks encompassed by a non-atomic thermodynamic block. The solver may retrieve, from the one or more identified sub-blocks, the connections and the stats provided by the one or more identified sub-blocks. The solver may generate a system of equations using the retrieved connections and stats. In some embodiments, the solver solves the system of equations to calculate one or more unknown values not measured by the one or more sensors.

In some embodiments, the solver is configured to identify the connections and the stats provided by one or more of the thermodynamic blocks and generate a system of equations using the identified connections and stats. The system of equations may include a plurality of variables. The solver may determine, for each of the plurality of variables with an unknown value, whether the unknown value can be calculated using the system of equations based on one or more of the plurality of variables with a known value. In response to a determination that the unknown value cannot be calculated using the system of equations, the solver may determine one or more additional constraints required to calculate the unknown value.

In some embodiments, the solver is configured to generate a user interface including the one or more additional constraints required to calculate the unknown value and a recommended action to establish the one or more additional constraints. In some embodiments, the recommended action includes at least one of installing a new sensor to measure a variable with an unknown value or defining a new connection between thermodynamic blocks.

Another implementation of the present disclosure is a building management system (BMS) including one or more sensors that measure a variable state or condition in the building management system. The BMS includes a plurality of atomic BMS devices that operate to affect the variable state or condition measured by the one or more sensors. Each of the atomic BMS devices stores an atomic thermodynamic model that represents the atomic BMS device and models a performance of the atomic BMS device. The BMS further includes a controller that operates to control a subsystem including the plurality of atomic BMS devices. The controller stores a non-atomic thermodynamic model that represents the subsystem and models a performance of the subsystem. Each of the thermodynamic models includes a list of connections that define one or more connections to other thermodynamic models and a list of stats that define one or more calculations based on the connections.

In some embodiments, the thermodynamic models include a first thermodynamic model representing a first thermodynamic system and a second thermodynamic model representing a second thermodynamic system. The connections to other thermodynamic models may represent an output from the first thermodynamic system that is provided as an input to the second thermodynamic system.

In some embodiments, the BMS includes a connections database that stores a plurality of connection objects. Each of the connection objects may correspond to a connection listed in at least one of the thermodynamic models and may define attributes of the corresponding connection. In some embodiments, the BMS includes a stats database that stores a plurality of stat objects. Each of the stat objects may correspond to a stat listed in at least one of the thermodynamic models and may define functional relationships between inputs and outputs of the thermodynamic model. In some embodiments, the connections define one or more inputs to the thermodynamic model and one or more outputs of the thermodynamic model. The stats may define one or more relationships between the inputs and the outputs.

In some embodiments, the controller is configured to request the atomic thermodynamic models from the plurality of atomic BMS devices. The plurality of atomic BMS devices may be configured to send the atomic thermodynamic models to the controller in response to the request. The controller may be configured to update the non-atomic thermodynamic model stored within the controller using the atomic thermodynamic models received from the plurality of atomic BMS devices.

In some embodiments, each of the BMS devices includes a solver configured to perform calculations using the stats and connections defined by the thermodynamic model stored within the BMS device.

In some embodiments, the solver is configured to access the list of connections and the list of stats provided by a thermodynamic model and identify one or more time series data inputs defined by the list of connections. The time series data inputs may be measured by the one or more sensors. The solver may identify one or more functions, defined by the list of stats, that use the identified time series data inputs. In some embodiments, the solver calculates one or more virtual data points not measured by the one or more sensors by applying the identified functions to the identified time series data inputs.

In some embodiments, the solver is configured to identify the connections and the stats provided by one or more of the thermodynamic models and generate a system of equations using the identified connections and stats. The system of equations may include a plurality of variables. The solver may determine, for each of the plurality of variables with an unknown value, whether the unknown value can be calculated using the system of equations based on one or more of the plurality of variables with a known value. In response to a determination that the unknown value cannot be calculated using the system of equations, the solver may determine one or more additional constraints required to calculate the unknown value. The solver may generate a report for presentation to a user via a user interface of the building management system. The report may include a recommended action to establish the one or more additional constraints.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

FIG. 15 is a block diagram of a thermodynamic model representing a chiller plant in which the systems and devices of the chiller plant are modeled as thermodynamic blocks, according to an exemplary embodiment.

FIG. 16 is a net list table defining the connections between the thermodynamic blocks in the thermodynamic model of FIG. 15, according to an exemplary embodiment.

FIG. 17 is a net descriptions table describing the connections defined in the net list table of FIG. 16, according to an exemplary embodiment.

FIG. 18 is an all connections table naming all of the connections defined in the net list table of FIG. 16, according to an exemplary embodiment.

DETAILED DESCRIPTION

Figure 1:
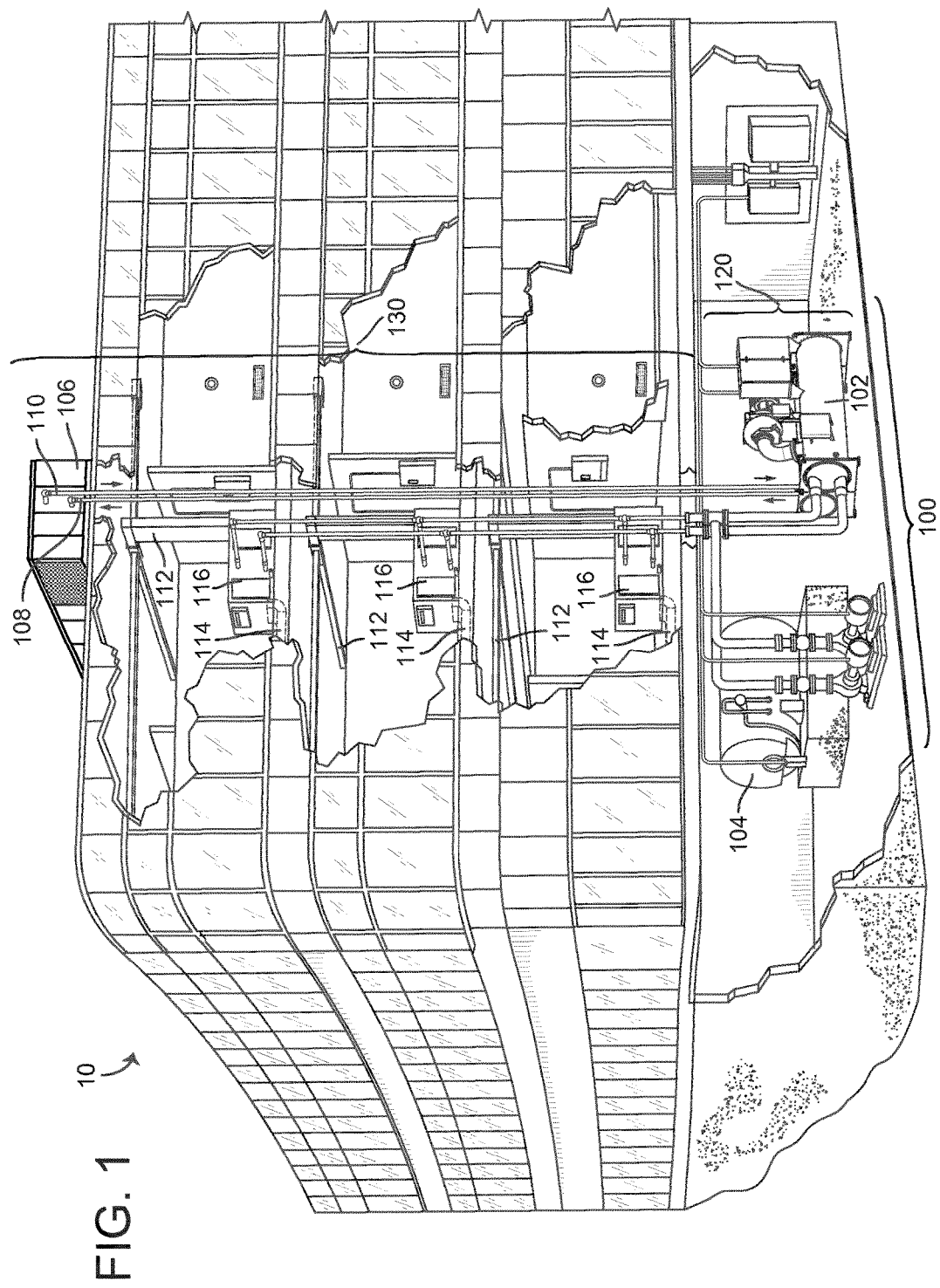
FIG. 1 is an illustration of a building equipped with a heating, ventilating, or air conditioning (HVAC) system, according to an exemplary embodiment.

Referring generally to the FIGURES, a building management system with linked thermodynamic models for HVAC equipment is shown, according to various exemplary embodiments. A building management system (BMS) is, in general, a system of devices configured to control, monitor, and manage equipment in or around a building or building area. A BMS can include a heating, ventilation, or air conditioning (HVAC) system, a security system, a lighting system, a fire alerting system, another system that is capable of managing building functions or devices, or any combination thereof. The BMS described herein uses a linked thermodynamic data model to collect, organize, process, compute, distribute, and manage information in the BMS. The thermodynamic data model may be capable of mapping all of the information collected by the BMS (e.g., sensor data, setpoint data, equipment performance data, etc.) into a single well-defined language that can be applied at any level within the BMS.

In some embodiments, the thermodynamic data model is based on the concept of an atomic thermodynamic system (i.e., the smallest thermodynamic system capable of being modeled). For example, each of the lowest level components of the BMS (e.g., individual chillers, pumps, cooling towers, etc.) may be modeled as atomic thermodynamic systems. Each atomic thermodynamic system may be defined by a set of inputs, outputs, and internal system dynamics. Atomic thermodynamic systems can be linked (e.g., connecting the outputs of one system to the inputs of another system), combined into assemblies, nested within higher level thermodynamic systems, or otherwise placed in relation to each other to define the architecture of the BMS.

In some embodiments, each instance of the thermodynamic data model is referred to as a thermodynamic block. Some thermodynamic blocks may be assemblies containing two or more atomic thermodynamic systems, whereas other thermodynamic blocks may be atomic (i.e., lowest level) thermodynamic systems. Advantageously, the arrangement of thermodynamic blocks relative to each other may provide the architecture of the BMS and the ability to calculate various performance metrics such as power usage and loads. Each BMS device may be capable of calculating its own performance metrics using the thermodynamic block stored within the device and may provide the results of such calculations to higher level devices (e.g., controllers, supervisory systems, etc.).

The use of thermodynamic blocks facilitates the disassembly and reassembly of the thermodynamic model at any junction. This allows the architecture of the thermodynamic model to be distributed across multiple BMS devices (e.g., building equipment, servers, controllers, etc.) for storage and/or computation. Each BMS device may store a thermodynamic block modeling the BMS device or a system controlled by the BMS device within the local memory of the BMS device. For example, a chiller or pump may store an atomic thermodynamic block modeling the chiller or pump, whereas a controller may store a non-atomic thermodynamic block modeling a system or subsystem controlled by the controller. Processing components within the BMS device (e.g., a processor, a processing circuit, etc.) may perform the calculations provided by the stored thermodynamic block. If the thermodynamic data model is distributed across multiple devices, the thermodynamic model can be collected (e.g., transmitted to a central controller or computer system), assembled, processed, and dispatched back with results of the calculations.

Solver modules within each BMS device may be configured to use one or more of the thermodynamic blocks to calculate or estimate data points that are not sampled by the BMS. The solvers may be configured to perform real time calculations and/or batch calculations. Real time calculations may include using time series data from sensors in conjunction with functional relationships defined by various thermodynamic blocks to calculate results. Batch calculations may include solving a system of equations defined by the connections between thermodynamic blocks and/or the functional relationships within each thermodynamic block. For example, the solver modules may be configured to solve the pressure loops within a HVAC system based on one or more known pressure measurements and/or run an advance simulation to predict the future performance of the HVAC system. If one or more required data points are missing, the solver modules may report that insufficient data points are available. In some embodiments, the solver modules are configured to identify and report the missing data points to a user along with recommended actions that can be taken to enhance the thermodynamic model (e.g., installing an additional sensor, defining relationships between thermodynamic blocks, etc.). These and other feature features of the present invention are described in greater detail below.

Referring now to FIG. 1, a perspective view of a building 10 is shown, according to an exemplary embodiment. Building 10 is serviced by a building management system including a HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or cooled fluid to an air handling unit of airside system 130. Airside system 130 may use the heated or cooled fluid to heat or cool an airflow provided to building 10. An exemplary waterside system and airside system are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 may be located in or around building 10 (as shown in FIG. 1) or at an offsite location such as a central plant. The working fluid may be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 or boiler 104 may be transported to AHU 106 via piping 108.

AHU 106 may place the working fluid in a heat exchange relationship with an airflow passing through AHU 106 (e.g., via one or more stages of cooling coils and/or heating coils). The airflow may be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements which can be operated to control an amount of the supply airflow provided to individual zones of building 10. In other embodiments, airside system 130 delivers the supply airflow into one or more zones of building 10 (e.g., via supply ducts 112) without requiring intermediate VAV units 116 or other flow control elements. AHU 106 may include various sensors (e.g., temperature sensors, pressure sensors, etc.) configured to measure attributes of the supply airflow. AHU 106 may also receive input from sensors located within the building zone and may adjust the flow rate and/or temperature of the supply airflow through AHU 106 to achieve setpoint conditions for the building zone.

Figure 2:
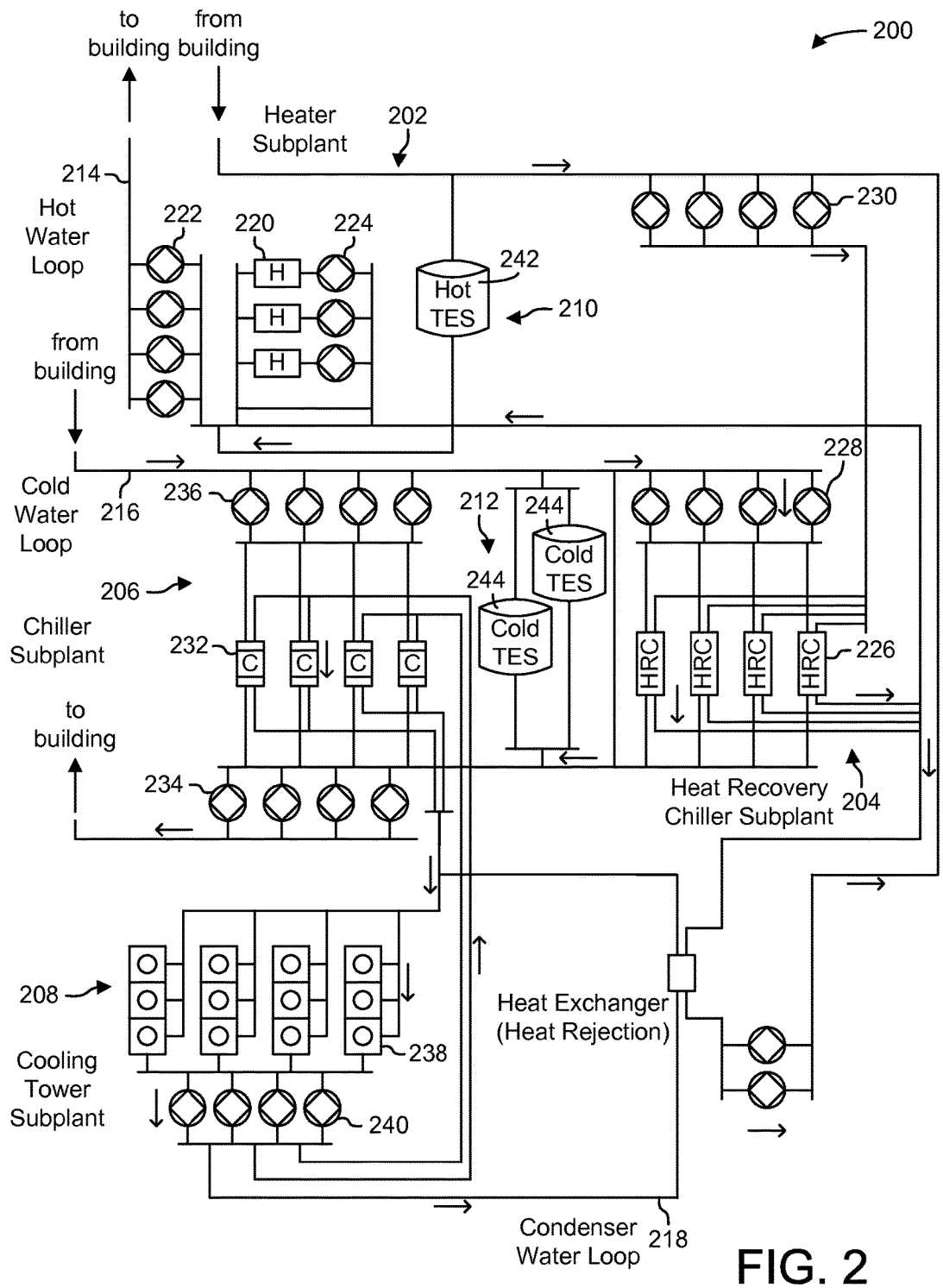
FIG. 2 is a schematic diagram illustrating a waterside system which may be used in conjunction with the HVAC system of FIG. 1, according to an exemplary embodiment.

Referring now to FIG. 2, a block diagram of a waterside system 200 is shown, according to an exemplary embodiment. In various embodiments, waterside system 200 may supplement or replace waterside system 120 in HVAC system 100 or may be implemented separate from HVAC system 100. When implemented in HVAC system 100, waterside system 200 may include a subset of the HVAC devices in HVAC system 100 (e.g., boiler 104, chiller 102, pumps, valves, etc.) and may operate to supply a heated or chilled fluid to AHU 106. The HVAC devices of waterside system 200 may be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 may be configured to heat water in a hot water loop 214 that circulates the hot water between heater subplant 202 and building 10. Chiller subplant 206 may be configured to chill water in a cold water loop 216 that circulates the cold water between chiller subplant 206 building 10. Heat recovery chiller subplant 204 may be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) may be used in place of or in addition to water to serve the thermal energy loads. In other embodiments, subplants 202-212 may provide heating and/or cooling directly to the building or campus without requiring an intermediate heat transfer fluid.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220.

Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves may be integrated with the pumps or positioned upstream or downstream of the pumps to control the fluid flows in waterside system 200. In various embodiments, waterside system 200 may include more, fewer, or different types of devices and/or subplants based on the particular configuration of waterside system 200 and the types of loads served by waterside system 200.

Figure 3:
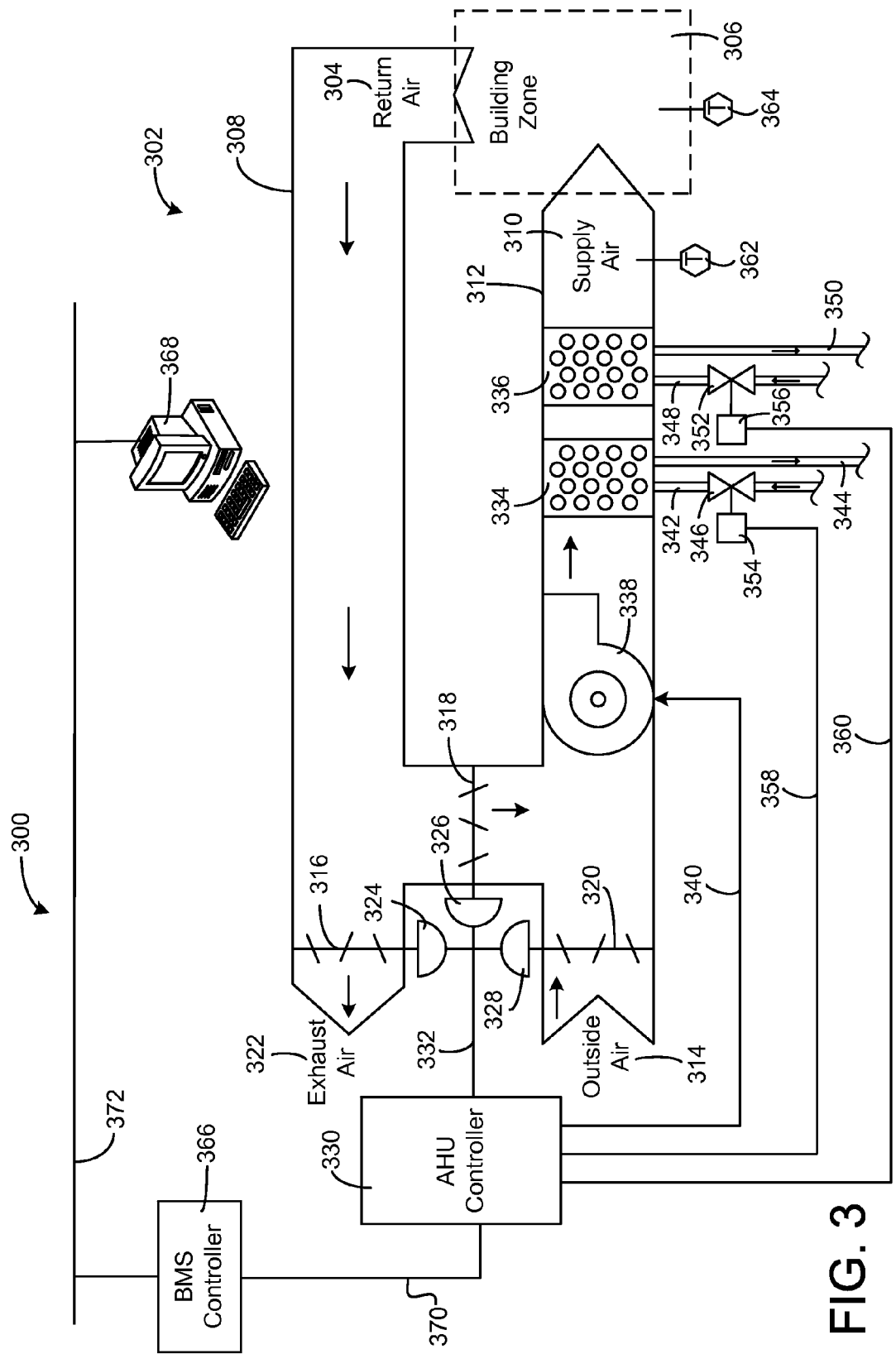
FIG. 3 is a schematic diagram of an airside system which may be used in conjunction with the HVAC system of FIG. 1, according to an exemplary embodiment.

Referring now to FIG. 3, a block diagram of an airside system 300 is shown, according to an exemplary embodiment. In various embodiments, airside system 300 may supplement or replace airside system 130 in HVAC system 100 or may be implemented separate from HVAC system 100. When implemented in HVAC system 100, airside system 300 may include a subset of the HVAC devices in HVAC system 100 (e.g., AHU 106, VAV units 116, ducts 112-114, fans, dampers, etc.) and may be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 may be configured to operate exhaust air damper 316, mixing damper 318, and outside air damper 320 to control an amount of outside air 314 and return air 304 that combine to form supply air 310. Any return air 304 that does not pass through mixing damper 318 may be exhausted from AHU 302 through exhaust damper 316 as exhaust air 322.

Each of dampers 316-320 may be operated by an actuator. For example, exhaust air damper 316 may be operated by actuator 324, mixing damper 318 may be operated by actuator 326, and outside air damper 320 may be operated by actuator 328. Actuators 324-328 may communicate with an AHU controller 330 via a communications link 332. Actuators 324-328 may receive control signals from AHU controller 330 and may provide feedback signals to AHU controller 330. Feedback signals may include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that may be collected, stored, or used by actuators 324-328. AHU controller 330 may be an economizer controller configured to use one or more control algorithms (e.g., state-based algorithms, ESC algorithms, PID control algorithms, model predictive control algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 may be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 may be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 may be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 may be controlled by an actuator. For example, valve 346 may be controlled by actuator 354 and valve 352 may be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 may include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 may be separate (as shown in FIG. 3) or integrated. In an integrated implementation, AHU controller 330 may be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 may be a computer workstation, a client terminal, a remote or local interface, or any other type of user interface device. Client device 368 may be a stationary terminal or a mobile device. For example, client device 368 may be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Figure 4:
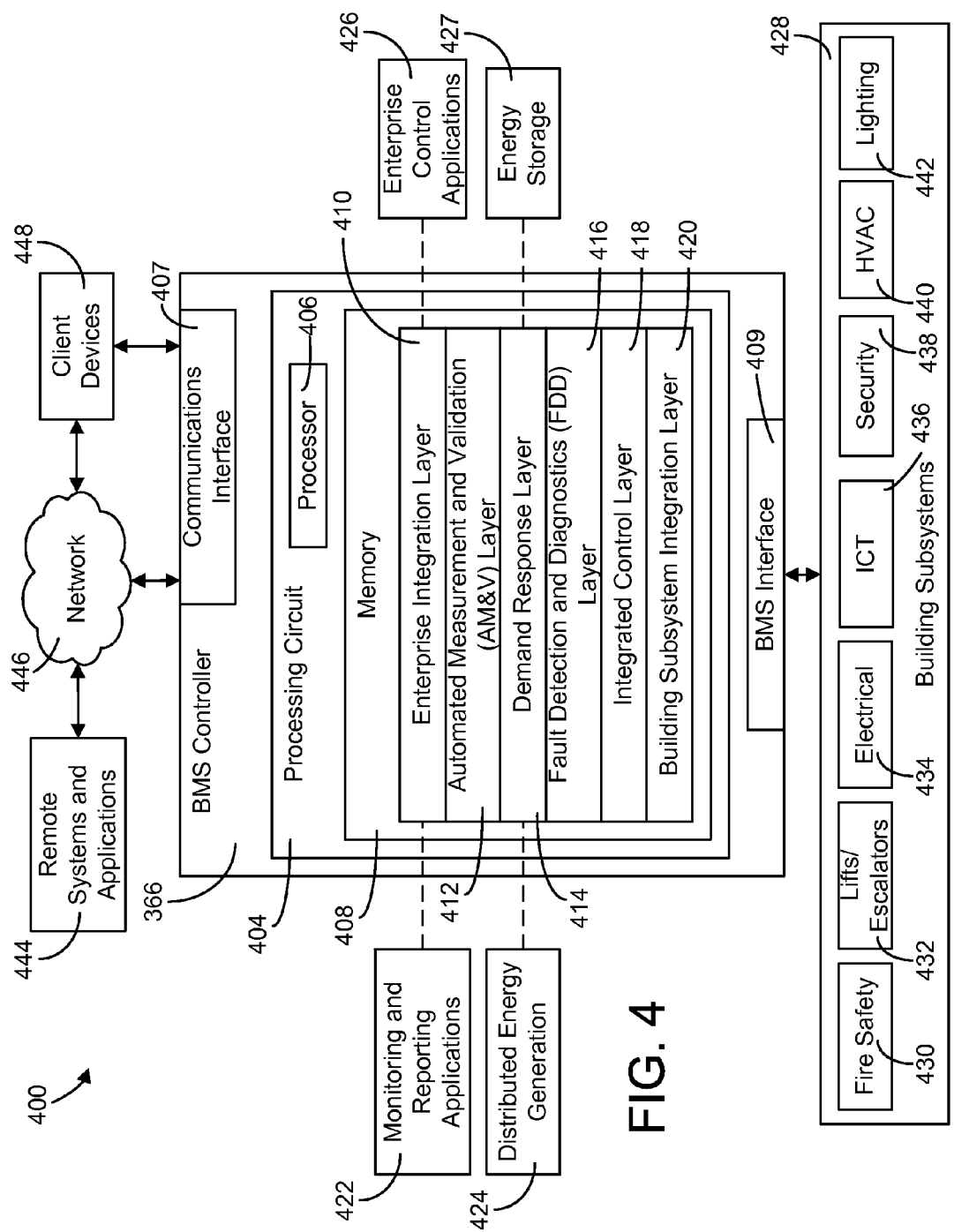
FIG. 4 is a block diagram of a building management system (BMS) which may be implemented in the building of FIG. 1, according to an exemplary embodiment.

Referring now to FIG. 4, a block diagram of a building management system (BMS) 400 is shown, according to an exemplary embodiment. BMS 400 may be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10.

Each of building subsystems 428 may include any number of devices, controllers, and connections for completing its individual functions and control activities. HVAC subsystem 440 may include many of the same components as HVAC system 100, as described with reference to FIGS. 1-3. For example, HVAC subsystem 440 may include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 may include any number of light fixtures, ballasts, lighting sensors, dimmers, or other devices configured to controllably adjust the amount of light provided to a building space. Security subsystem 438 may include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 may be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a WiFi transceiver for communicating via a wireless communications network. In another example, one or both of interfaces 407, 409 may include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 may be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 408 may be or include volatile memory or non-volatile memory. Memory 408 may include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In an exemplary embodiment, BMS controller 366 is integrated within a single computer (e.g., one server, one housing, etc.). In various other exemplary embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 may be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 may be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 may be configured to serve clients or local applications with information and services to support a variety of enterprise-level applications. For example, enterprise control applications 426 may be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 may be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 may be configured to optimize resource usage (e.g., electricity use, natural gas use, water use, etc.) and/or the monetary cost of such resource usage in response to satisfy the demand of building 10. The optimization may be based on time-of-use prices, curtailment signals, energy availability, or other data received from utility providers, distributed energy generation systems 424, from energy storage 427, or from other sources. Demand response layer 414 may receive inputs from other layers of BMS controller 366 (e.g., building subsystem integration layer 420, integrated control layer 418, etc.). The inputs received from other layers may include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models may include, for example, thermodynamic models describing the inputs, outputs, and/or functions performed by various sets of building equipment. Equipment models may represent collections of building equipment (e.g., subplants, chiller arrays, etc.) or individual devices of the building equipment. In some embodiments, each device stores its own equipment model in memory and provides the equipment model to higher level devices (e.g., plant controllers, AHU controllers, subsystem controllers, etc.) in response to a request for the equipment models from the higher level devices.

Demand response layer 414 may further include or draw upon one or more demand response policy definitions (e.g., databases, XML files, etc.). The policy definitions may be edited or adjusted by a user (e.g., via a graphical user interface) so that the control actions initiated in response to demand inputs may be tailored for the user's application, desired comfort level, particular building equipment, or based on other concerns. For example, the demand response policy definitions can specify which equipment may be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 may be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In an exemplary embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 may be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 may be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 may be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 may be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 may be configured to provide calculated inputs (e.g., aggregations) to these higher levels based on outputs from more than one building subsystem.

Automated measurement and validation (AM&V) layer 412 may be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 may be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 may be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults may include providing an alert message to a user, a maintenance scheduling system, or a control algorithm configured to attempt to repair the fault or to work-around the fault.

FDD layer 416 may be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to an exemplary embodiment, FDD layer 416 (or a policy executed by an integrated control engine or business rules engine) may shut-down systems or direct control activities around faulty devices or systems to reduce energy waste, extend equipment life, or assure proper control response.

FDD layer 416 may be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 may include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Referring now to FIGS. 5-18, a linked thermodynamic data model for HVAC equipment is shown, according to an exemplary embodiment. The thermodynamic data model described herein may be used to collect, organize, process, compute, distribute, and manage information in BMS 400. The thermodynamic data model may be capable of mapping all of the information collected by BMS 400 (e.g., sensor data, setpoint data, equipment performance data, etc.) into a single well-defined language that can be applied at any level within BMS 400. In some embodiments, the thermodynamic data model is based on the concept of an atomic thermodynamic system (i.e., the smallest thermodynamic system capable of being modeled). For example, each of the lowest level components of BMS 400 (e.g., individual chillers, pumps, cooling towers, etc.) may be modeled as atomic thermodynamic systems. Each atomic thermodynamic system may be defined by a set of inputs, outputs, and internal system dynamics. Atomic thermodynamic systems can be linked (e.g., connecting the outputs of one system to the inputs of another system), combined into assemblies, nested within higher level thermodynamic systems, or otherwise placed in relation to each other to define the architecture of BMS 400.

In some embodiments, each instance of the thermodynamic data model is referred to as a thermodynamic block. Some thermodynamic blocks may be assemblies containing two or more atomic thermodynamic systems, whereas other thermodynamic blocks may be atomic (i.e., lowest level) thermodynamic systems. Advantageously, the arrangement of thermodynamic blocks relative to each other may provide the architecture of the HVAC system and the ability to calculate various performance metrics such as power usage and loads. Each thermodynamic block may be capable of calculating its own performance metrics and providing the results to higher level assemblies. For example, if an assembly has multiple thermodynamic blocks within it, the overall power consumption of the assembly may be a sum of the individual power consumptions for each thermodynamic block within the assembly.

Additionally, the use of thermodynamic blocks facilitates the disassembly and reassembly of the thermodynamic data model at any junction. This allows the architecture of the data model to be distributed across multiple HVAC devices (e.g., building equipment, servers, controllers, etc.) for storage and/or computation. Each HVAC device may store a thermodynamic block modeling the HVAC device or a system controlled by the HVAC device within the local memory of the HVAC device. For example, a chiller or pump may store an atomic thermodynamic block modeling the chiller or pump, whereas a controller may store a non-atomic thermodynamic block modeling a system or subsystem controlled by the controller. Processing components within the HVAC device (e.g., a processor, a processing circuit, etc.) may perform the calculations provided by the stored thermodynamic block. If the thermodynamic data model is distributed across multiple devices, the data model can be collected (e.g., transmitted to a central controller or computer system), assembled, processed, and dispatched back with results of the calculations.

Figure 5:
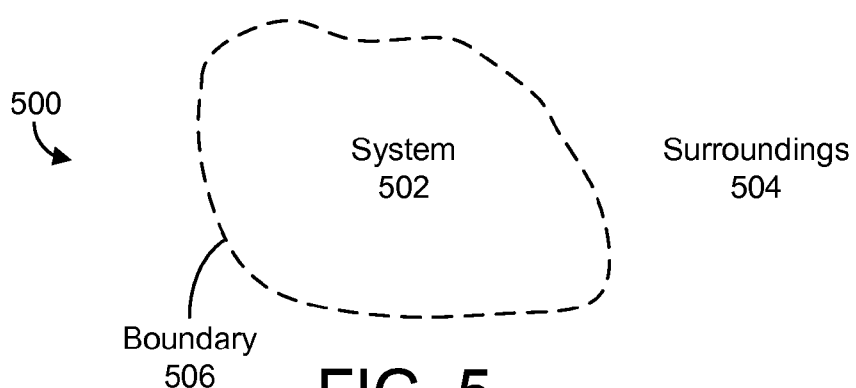
FIG. 5 is a drawing of an atomic thermodynamic block which represents an arbitrary thermodynamic system and which serves as the foundation for the thermodynamic models of the present invention, according to an exemplary embodiment.

Referring particularly to FIG. 5, an atomic thermodynamic block 500 is shown, according to an exemplary embodiment. Thermodynamic block 500 represents an arbitrary thermodynamic system 502 and includes a boundary 506 which separates system 502 from its surroundings 504. The first law of thermodynamics ensures that thermodynamic system 502 will conserve energy and mass through its inputs, outputs, and interactions with other thermodynamic systems. The second law of thermodynamics provides that this energy is expected to deteriorate in quality over time due to the increasing entropy of system 502. Multiple instances of thermodynamic block 500 can be used to represent each of the lowest level devices within BMS 400 (e.g., chillers, pumps, heaters, controllers, etc.).

Figure 6:
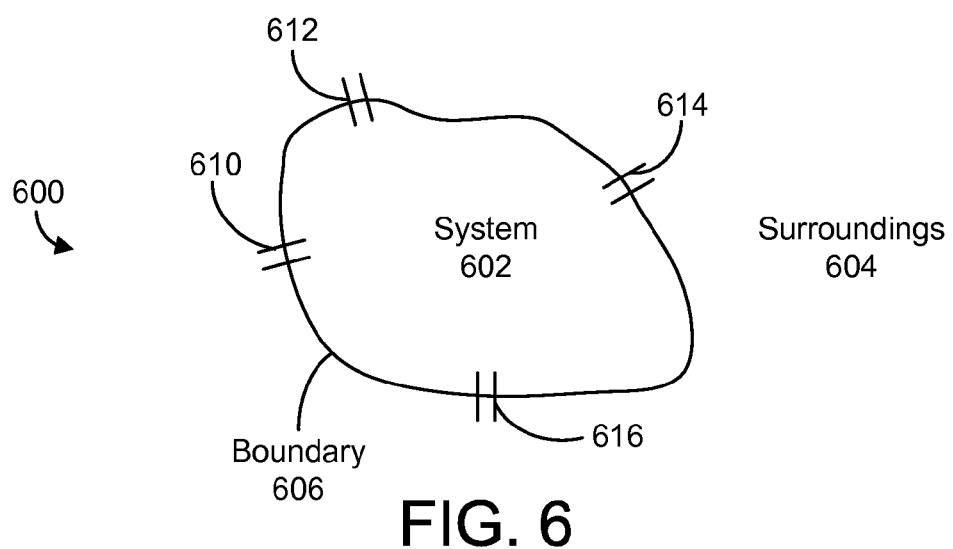
FIG. 6 is a drawing of an atomic thermodynamic block with an adiabatic and impermeable boundary and several connections which model inputs and outputs of the thermodynamic system, according to an exemplary embodiment.

Referring now to FIG. 6, another atomic thermodynamic block 600 is shown, according to an exemplary embodiment. Thermodynamic block 600 represents an arbitrary thermodynamic system 602 and includes a boundary 606 which separates system 602 from its surroundings 604. In thermodynamic block 600, boundary 606 is assumed to be adiabatic and impermeable such that the only transfer of mass, energy, or information into system 602 is through connections 610, 612, 614, and 616. Connections 610-616 link system 602 to surroundings 604. Connections 610-616 may include fluid connections (e.g., pipes, vents, ductwork, etc.) through which mass and energy can transfer through boundary 606, solid connections (e.g., walls, housings, etc.) through which heat and other types energy can transfer through boundary 606, data connections (e.g., wires, cables, etc.) through which control signals and other types of information can transfer through boundary 606, and/or any other type of connection that links system 602 to surroundings 604.

In some embodiments, all of the flows of mass, energy, and information into system 602 or out of system 602 are represented by various types of connections 610-616 in thermodynamic block 600. As the number of connections 610-616 increases, thermodynamic block 600 more closely models a real-world thermodynamic system and provides a more accurate representation of how system 602 interacts with its surroundings 604. The use of connections 610-616 to model various transfers through boundary 6106 appeals to Fourier series and facilitates more accurate representations of system 602 as mode coefficients are supplied.

Advantageously, thermodynamic block 600 can be used to represent a real-world thermodynamic system with any level of detail. For example, a lesser number of connections 610-616 can be used to roughly approximate a thermodynamic system whereas a greater number of connections 610-616 can be used to model the thermodynamic system in greater detail. The performance of the thermodynamic data model can be scaled based on how much detail is provided in its configuration. For example, more connections 610-616 can be defined to improve the performance of the thermodynamic data model.

Thermodynamic block 600 may be used as a building block to model any arbitrarily complex thermodynamic system provided that connections 610-616 are well-defined. The internal dynamics of system 602 may be defined according to the properties of system 602, various thermodynamic relationships, and/or functions that system 602 performs to translate inputs into outputs. For example, if system 602 represents a chiller, the internal dynamics may define the cooling load provided by the chiller (i.e., an output from system 602) as a function of the power consumption and/or water consumption of the chiller (i.e., inputs to system 602). In this way, the outputs from system 602 can be defined based on the particular inputs provided to system 602 and the internal dynamics of system 602. Each thermodynamic block in the thermodynamic data model may store various equations, equipment models, or other relationships that define its internal dynamics.

Thermodynamic block 600 stores internal system dynamics but does not contain any other nested thermodynamic blocks. Therefore, thermodynamic block 600 is an atomic (i.e., lowest level) thermodynamic block. As described above, atomic thermodynamic blocks may represent lowest level building equipment such as chillers, pumps, etc. Atomic thermodynamic blocks may also represent pipes. An atomic thermodynamic block representing a pipe may have one connection representing fluid flow into the pipe and another connection representing fluid flow out of the pipe. An atomic thermodynamic block representing a pipe may store properties of the pipe such as diameter, material, and length. The atomic thermodynamic block may also store one or more equations which can be used to compute the total resistance between the two fluid flow connections. This provides the ability to calculate the amount of pressure lost within the pipe. A more complex thermodynamic block representing a pipe may include heat transfer connections and may store one or more equations which can be used to calculate the amount of heat transfer through the walls of the pipe.

Figure 7:
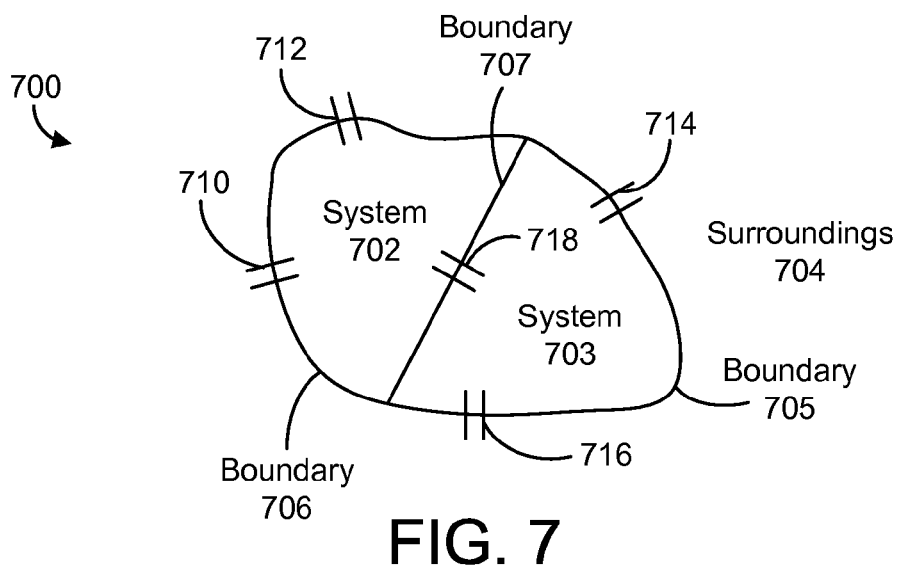
FIG. 7 is a drawing of a non-atomic thermodynamic block which encapsulates two atomic thermodynamic blocks, according to an exemplary embodiment.

Referring now to FIG. 7, another thermodynamic block 700 is shown, according to an exemplary embodiment.

Thermodynamic block 700 represents an assembly of two thermodynamic systems 702 and 703. Systems 702 and 703 are separated from surroundings 704 by boundaries 706 and 705, respectively. Connections 710-712 represent mass, energy, or information transfers between system 702 and surroundings 704. Similarly, connections 714-716 represent mass, energy, or information transfers between system 703 and surroundings 704. Systems 702-703 are separated from each other by a shared boundary 707 and linked by a connection 718 through boundary 707. Boundaries 705-707 may be assumed to be adiabatic and impermeable such that all of the mass, energy, and/or information transfers through boundaries 705-707 occur via connections 710-718.

In some embodiments, the dynamics of thermodynamic block 700 are defined by the dynamics of the systems that thermodynamic block 700 encapsulates (i.e., systems 702-703). Each of systems 702-703 may be modeled using an atomic thermodynamic block (e.g., thermodynamic block 600) and may be defined by specifying the connections and internal system dynamics of each atomic thermodynamic block, as described with reference to FIG. 6. In some embodiments, only the atomic thermodynamic blocks are fully defined by system dynamics in the thermodynamic data model. Higher level assemblies such as thermodynamic block 700 may inherit the combined dynamics of the atomic thermodynamic blocks that the assembly encapsulates. This structure can be used to develop a tree of relationships where the only fully-defined level of the thermodynamic data model is the lowest level consisting of atomic thermodynamic blocks. Any thermodynamic blocks above the lowest level (i.e., thermodynamic blocks that contain one or more atomic thermodynamic blocks) may have properties and/or dynamics that are computationally inferred from the atomic thermodynamic blocks contained therein.

Figure 8:
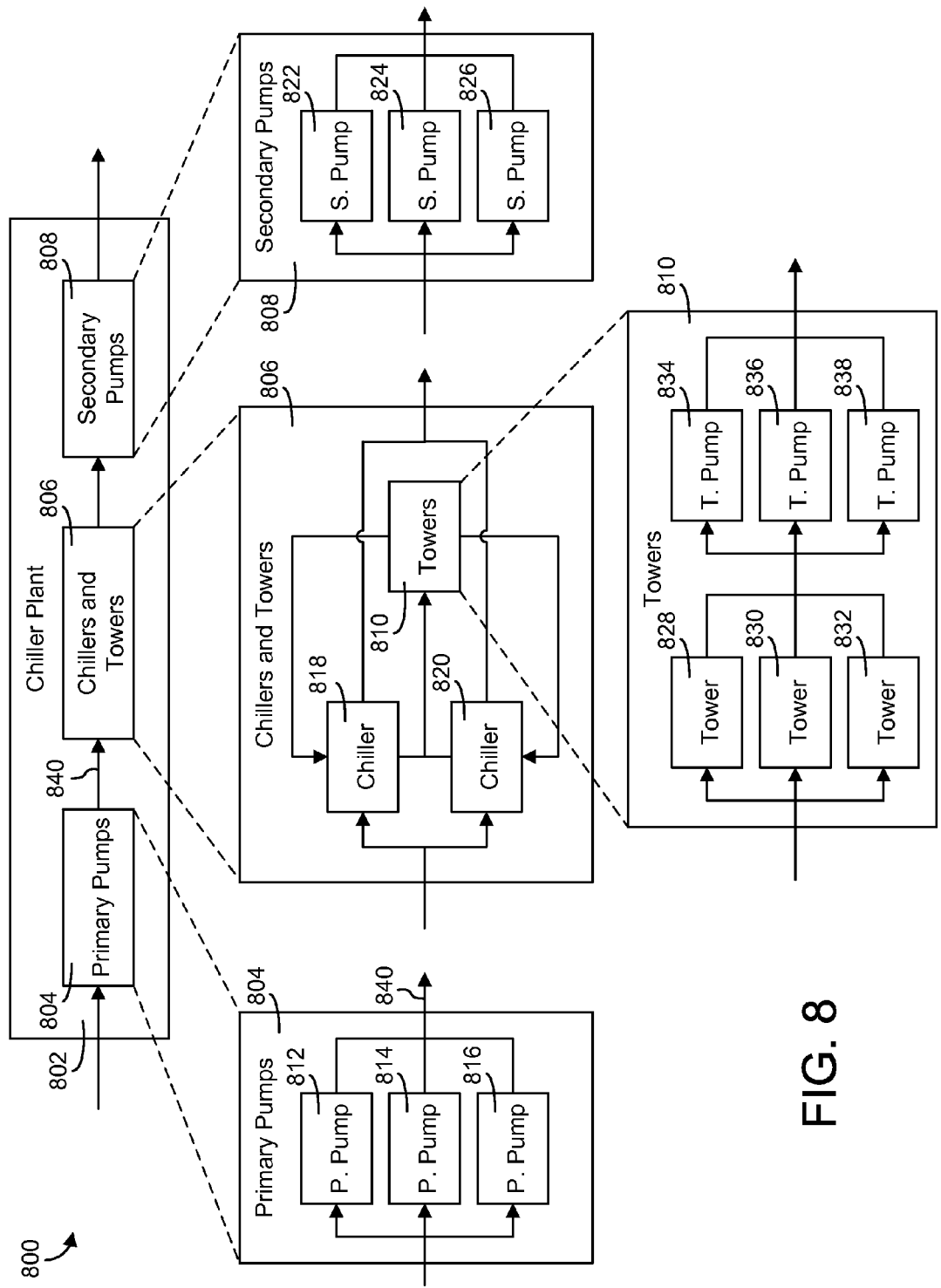
FIG. 8 is a block diagram of a HVAC system model which uses thermodynamic blocks based on the thermodynamic blocks shown in FIGS. 5-7 to model HVAC devices and collections of HVAC devices, according to an exemplary embodiment.

Referring now to FIG. 8, a diagram of a HVAC system model 800 based on thermodynamic blocks is shown, according to an exemplary embodiment. Model 800 represents a chiller plant 802, which may be the same or similar to chiller subplant 206, as described with reference to FIG. 2. Model 800 is shown to a variety of linked thermodynamic blocks. The blocks in model 800 that do not encapsulate any other blocks are atomic thermodynamic blocks which model lowest level building equipment (e.g., individual pumps, individual towers, individual chillers, etc.) in chiller plant 802. The other blocks in model 800 are higher level (i.e., non-atomic) thermodynamic blocks which model subsystems containing one or more atomic thermodynamic blocks. Each of the atomic thermodynamic blocks shown in FIG. 8 may be a unique instantiation of the thermodynamic data model in the digital domain. The structure and features of the thermodynamic data model used to create the thermodynamic blocks is described in greater detail with reference to FIGS. 9-14.

Still referring to FIG. 8, the highest level of HVAC system model 800 is shown to include a primary pumps block 804, a chillers and towers block 806, and a secondary pumps block 808. Each of blocks 804-808 models a portion of chiller plant 802 and includes several lower level blocks contained therein. For example, primary pumps block 804 models a collection of primary pumps and contains several lower level primary pump blocks 812, 814, and 816. Each of primary pump blocks 812-816 models one of the primary pumps in chiller plant 802 and is an atomic thermodynamic block. Similarly, secondary pumps block 808 models a collection of secondary pumps and contains several lower level secondary pump blocks 822, 824, and 826. Each of secondary pump blocks 822-826 models one of the secondary pumps in chiller plant 802 and is an atomic thermodynamic block.

Chillers and towers block 806 models a collection of chillers and a collection of towers in chiller plant 802. The collection of chillers is modeled by chiller blocks 818 and 820, which are shown as atomic thermodynamic blocks within chillers and towers block 806. The collection of towers is modeled by towers block 810, which is shown as a non-atomic thermodynamic block within chillers and towers block 806. Towers block 810 contains several lower level tower blocks 828, 830, and 832 and several lower level tower pump blocks 834, 836, and 838. Each of tower blocks 828-832 models one of the cooling towers in chiller plant 802 and is an atomic thermodynamic block. Similarly, each of tower pump blocks 834-838 models one of the tower pumps in chiller plant 802 and is an atomic thermodynamic block.

As shown in FIG. 8, thermodynamic blocks can exist at any level within HVAC system model 800. Some thermodynamic blocks are non-atomic blocks (e.g., primary pumps block 804, chillers and towers block 806, secondary pumps block 808, towers block 810, etc.) which model higher level systems, subsystems, and/or collections of equipment within chiller plant 802. Other thermodynamic blocks are atomic thermodynamic blocks (e.g., primary pumps blocks 812-816, chiller blocks 818-820, secondary pumps blocks 822-826, towers blocks 828-832, tower pump blocks 834-838, etc.) which model lowest level equipment in chiller plant 802. Non-atomic blocks may contain one or more lower level blocks. The one or more lower level blocks contained within a non-atomic block may be atomic blocks or other non-atomic blocks. For example, chillers and towers block 806 is shown as a non-atomic block which contains two atomic thermodynamic blocks 818-820 and a non-atomic thermodynamic block 810.

The arrows in FIG. 8 represent the inputs and outputs of each thermodynamic block. Arrows connecting thermodynamic blocks indicate that an output from one of the thermodynamic blocks is provided as an input to another of the thermodynamic blocks. For example, arrow 840 indicates that the output from primary pumps block 804 is provided as an input to chillers and towers block 806. Each of the atomic thermodynamic blocks may store one or more equipment models and/or thermodynamic relationships that can be used to compute the outputs of the atomic thermodynamic block as a function of the inputs. The outputs of a non-atomic thermodynamic block may be computed by summing the output of one or more atomic thermodynamic blocks contained therein. For example, the output from primary pumps block 804 may be computed by summing the outputs from each of primary pump blocks 812-814. In some embodiments, the data model used to construct the thermodynamic blocks is capable of infinite recursion by nesting various lower level thermodynamic blocks within higher level thermodynamic blocks. As long as the outputs and system dynamics of the atomic thermodynamic blocks are defined and calculable, the outputs and system dynamics of any higher level thermodynamic blocks can be determined (i.e., by combining the outputs of the atomic blocks, as previously described).

Advantageously, the calculations defined by each of the thermodynamic blocks may be based solely on the inputs to the thermodynamic block, the internal system dynamics of the thermodynamic block, and the outputs of any lower level blocks contained therein. For example, chillers and towers block 806 may define calculations based solely on the input from primary pumps block 804 and the outputs of chiller blocks 818-820 and towers block 810 without considering that towers block 810 includes several lower level blocks 828-838. This feature provides a level of abstraction which allows higher level computations to be performed (e.g., by chillers and towers block 806) without requiring lower level data to be processed or communicated outside of the lower level blocks (e.g., outside of towers block 810).

In some embodiments, HVAC system model 800 uses the same data structure in both atomic blocks and non-atomic blocks. For example, each of the thermodynamic blocks shown in FIG. 8 may be based on the same template or model data structure. In some embodiments, the template data structure used to construct each of thermodynamic blocks 804-838 includes an attribute which allows lower level blocks to be defined within the thermodynamic block. A thermodynamic block may be classified as a non-atomic block if one or more lower level blocks are defined within the thermodynamic block. Conversely, a thermodynamic block may be classified as an atomic block if no lower level blocks are defined within the thermodynamic block. A template data model which may be used to construct thermodynamic blocks 804-838 is described in greater detail with reference to FIGS. 9-14.

Figure 9:
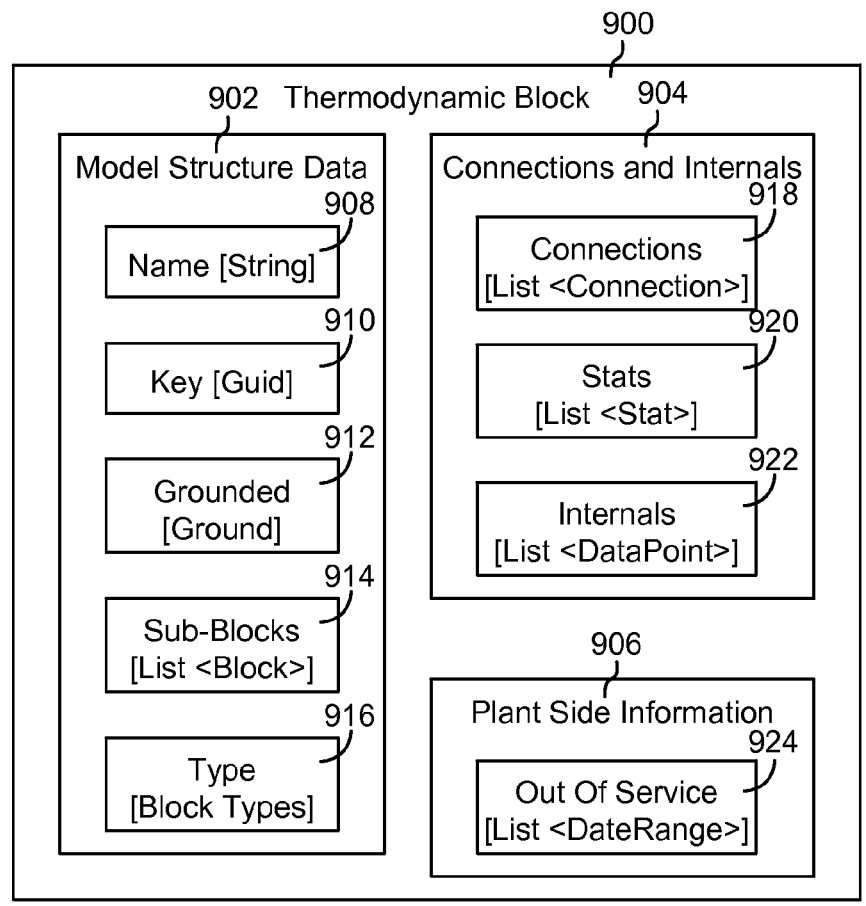
FIG. 9 is a block diagram of a template thermodynamic block which may be used to generate the various thermodynamic blocks of FIG. 8, according to an exemplary embodiment.

Referring now to FIG. 9, a template thermodynamic block 900 is shown, according to an exemplary embodiment. Thermodynamic block 900 illustrates a template data model which may be used to construct thermodynamic blocks 804-838 in HVAC system model 800. Thermodynamic block 900 may be used to construct both atomic thermodynamic blocks and non-atomic thermodynamic blocks and may be instantiated to define each component of the HVAC system the digital domain. Relationships between HVAC devices (e.g., fluid flow, physical connections, data communications, entity relationships, etc.) may be modeled by the connections 918 defined within each instance of thermodynamic block 900.

In some embodiments, an instance of thermodynamic block 900 is stored within the local memory of one or more devices in the HVAC system. Each HVAC device may store an instance of thermodynamic block 900 which models the HVAC device or a system controlled by the HVAC device. For example, a chiller or pump may store an instance of thermodynamic block 900 which models the chiller or pump, whereas a controller may store an instance of thermodynamic block 900 which models a system or subsystem controlled by the controller. In some embodiments, processing components within each HVAC device (e.g., a processor, a processing circuit, etc.) perform calculations defined by thermodynamic block 900 in order to model the performance of the HVAC device and/or a system or subsystem controlled by the HVAC device.

The calculations performed by a HVAC device may be defined by stats 920 stored within thermodynamic block 900. Stats 920 may identify formulas or equations that model the performance of the HVAC device and/or define relationships between inputs and outputs for the HVAC device. For example, stats 920 for a chiller may include an equipment model that defines the cooling load provided by the chiller as a function of the chiller's resource consumption (e.g., electricity, water, etc.). In various embodiments, stats 920 stores the formulas/equations within thermodynamic block 900 or within a separate stat object (e.g., stat object 1100 shown in FIG. 11). The results of such calculations may propagate to higher level HVAC devices such as subsystem controllers and/or BMS controllers. If thermodynamic block 900 includes any sub-blocks, the stats defined by the sub-block may be processed by the HVAC device in order to propagate information to higher level devices.

In some embodiments, thermodynamic block 900 defines one or more data points which represent lowest level information available to thermodynamic block 900. Data points may include, for example, time series data (e.g., measured or calculated data values), design parameters, control parameters, device setpoints, or other data values which may be used in the identified stats 920 to perform the various calculations defined by thermodynamic block 900. These and other features of thermodynamic block 900 are described in greater detail below.

Still referring to FIG. 9, thermodynamic block 900 is shown to include model structure data 902, connections and internals 904, and plant side information 906. Model structure data 902 may include data specific to a particular instance of thermodynamic block 900 and the data model. In some embodiments, model structure data 902 is used to identify, store, or persist the hierarchical structure of the data model. Model structure data 902 is shown to include a name 908, a key 910, a grounded indicator 912, a sub-blocks attribute 914, and a type attribute 916. Name 908 may define a name for thermodynamic block 900. The name may be provided by a user or automatically generated and may be stored as a text string. Key 910 may define a unique GUID used for storage and mapping to outside sources. Grounded indicator 912 may be used to flag thermodynamic block 900 as a type of ground when thermodynamic block 900 is used to solve for unknown values in the HVAC system. Sub-blocks attribute 914 may define any other thermodynamic blocks that are nested within thermodynamic block 900. The information provided by sub-blocks attribute 914 may be used to construct or reconstruct a hierarchy for the HVAC system. Type attribute 916 may define a type of thermodynamic block 900 and may reduce or eliminate polymorphism.

Connections and internals 904 may define the inputs, outputs, and internal system dynamics of the system or device represented by thermodynamic block 900. Connections and internals 904 is shown to include connections 918, stats 920, and internals 922. Connections 918 may store a list of connections that define the inputs and outputs of thermodynamic block 900. Each of the listed connections may identify a connection object that provides detailed information about the connection. An exemplary connection object is described in greater detail with reference to FIG. 10. Stats 920 may store a list of stats that define calculations based on connections 918. In some embodiments, stats 920 propagate up to higher level blocks. Each of the listed stats may identify a stat object that provides detailed information about the stat. An exemplary stat object is described in greater detail with reference to FIG. 11. Internals 922 may store a list of data points that are used internal to the system. For example, internals 922 may define a design parameter for the modeled HVAC device. Each of the listed data points may identify a data point object that provides detailed information about the data point. An exemplary data point object is described in greater detail with reference to FIG. 12.

Plant side information 906 may store site-related information within thermodynamic block 900. Plant side information 906 may include values that are common to many types of thermodynamic blocks within the same system or subsystem. Plant side information 906 is shown to include an out of service attribute 924. Out of service attribute 924 may store a list of times (e.g., ranges of times or dates) that the HVAC equipment represented by thermodynamic block 900 will be out of service.

Figure 10:
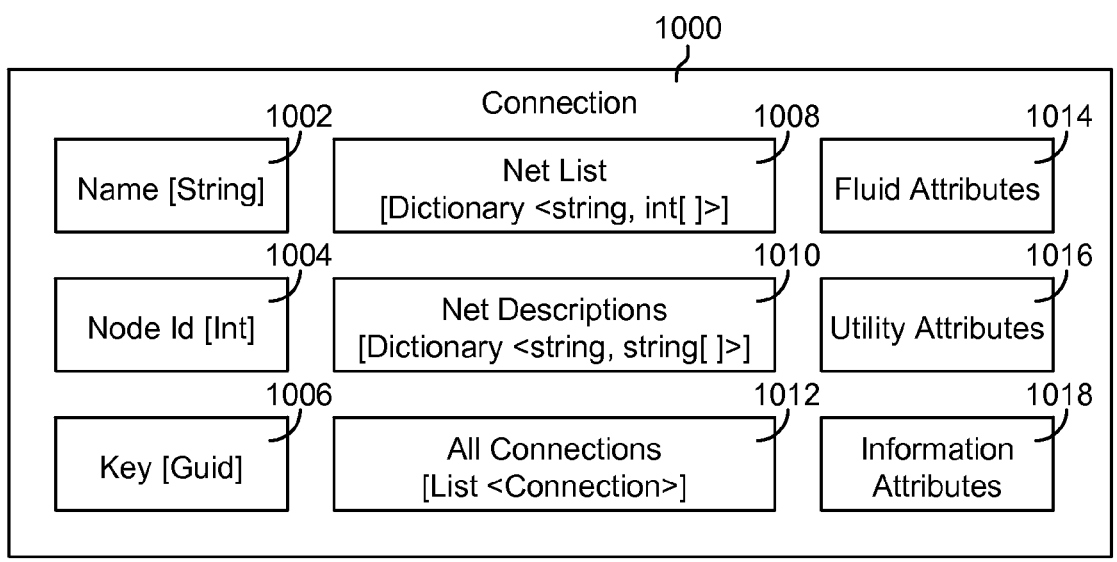
FIG. 10 is a block diagram of a connection object which may be used to define a connection attribute of the template thermodynamic block of FIG. 9, according to an exemplary embodiment.

Referring now to FIG. 10, a connection object 1000 is shown, according to an exemplary embodiment. Connection object 1000 may provide detailed information about one of the connections listed in connections 918 and may be used to define various types of connections between instances of thermodynamic block 900. Connection object 1000 may be instantiated such that each of the connections listed in connections 918 corresponds to a unique connection object 1000. In various instances, connection object 1000 may define an energy flow, a mass flow, or an information flow into or out of the thermodynamic system. Information flows may include, for example, command or control data, utility rates, weather data, measured or calculated values from other HVAC components (e.g., sensors, controllers, etc.), or any other type of information which may be generated or used by thermodynamic block 900 and/or the HVAC component modeled by thermodynamic block 900. Connection object 1000 may be stored within the local memory of the HVAC device that stores thermodynamic block 900, retrieved from an external database, or obtained from any other data source.

Connection object 1000 is shown to include a name 1002, a node ID 1004, a key 1006, a net list 1008, net descriptions 1010, and all connections 1012. Name 1002 may define a name for connection object 1000. The name may be provided by a user or automatically generated and may be stored as a text string. Node ID 1004 may store an integer value that defines the ID of the connection. In some embodiments, each connection has a unique node ID. Key 1006 may define a unique GUID used for storage and mapping to outside sources.

Net list 1008 may store a list defining how the various thermodynamic blocks in the data model are interconnected. For example, net list 1008 may list each of the thermodynamic blocks in the data model and indicate which connections apply to each thermodynamic block. Connections may be listed by their node IDs in net list 1008. For example, net list 1008 may indicate that a particular thermodynamic block (e.g., "Chiller") has connections with node IDs 1004 of "1," "4," "2," "7" and "5." An exemplary net list is described in greater detail with reference to FIG. 16.

Net descriptions 1010 may store a list of descriptions for the various connections identified in net list 1008. Net descriptions 1010 may provide a name for each connection and indicate the directionality of the connection with respect to the thermodynamic objects to which the connection applies. For example, net descriptions 1010 may indicate that the thermodynamic block "Chiller" has connections "ElecIn, "EvapIn," "EvapOut," "CondIn," and "CondOut." The number of descriptions for each thermodynamic block in net descriptions 1010 may match the number of listed connections for the thermodynamic block in net list 1008. The order in which the descriptions are listed in net descriptions 1010 may correspond to the order in which the connections are listed in net list 1008. For example, the information provided by net list 1008 and net descriptions 1010 for "Chiller" indicates that connection "1" is an electrical connection into the chiller, connection "4" is an evaporator connection into the chiller, connection "2" is an evaporator connection out of the chiller, connection "7" is a condenser connection into the chiller, and connection "5" is a condenser connection out of the chiller. Exemplary net descriptions are described in greater detail with reference to FIG. 17.

All connections 1012 may store a list of references to all of the connections in the thermodynamic model. In some embodiments, the list is a static list stored in a single memory location for all of the connections. All connections 1012 may index the list by the node ID 1004 of the connection and provide a name for each of the connections. An exemplary all connections list is described in greater detail with reference to FIG. 18.

In some embodiments, the directionality of each connection is identified by the manner in which the connection is applied to the thermodynamic objects. For example, a connection to the input side of a thermodynamic object may identify the connection as an input connection relative to the thermodynamic object, whereas a connection to the output side of the thermodynamic object may identify the connection as an output connection relative to the thermodynamic object. If a condition occurs where the flow is the opposite of the direction indicated by the connection, a negative value can be assigned to the flow rate to indicate that the flow is opposite the indicated direction. In other embodiments, the directionality of the connection is specified in net descriptions 1010.

Still referring to FIG. 10, connection object 1000 is shown to include fluid attributes 1014, utility attributes 1016, and information attributes 1018. Attributes 1014-1018 may be provided for certain types of connections to provide a clear indication of what the connection represents. For example, fluid attributes 1014 may be included in connection objects that describe fluid connections. Fluid attributes 1014 may characterize the fluid flow between thermodynamic blocks and may include attributes such as temperature, pressure, flow rate, enthalpy, or any other attribute of the fluid flow. Fluid attributes 1014 may also describe the type of fluid and its various properties (e.g., heat capacity, density, fluid name, etc.).

Utility attributes 1016 may be included in connection objects that describe utility connections. Utility attributes 1016 may characterize a flow of a particular utility (e.g., electricity, water, natural gas, etc.) into or out of the system. In some embodiments, utility attributes 1016 include the usage of the utility, the type of utility, the rate of the utility, and/or the cost of the utility. The type of utility may be specified as a text string, whereas the other utility attributes 1016 and fluid attributes 1014 may be specified as time series data.

Information attributes 1018 may be included in connection objects that describe the flow of information between thermodynamic blocks. Information attributes 1018 may include, for example, type attributes characterizing the type of information (e.g., setpoint, measured value, calculated value, etc.), units for the information if the information is a numerical value, and/or any other attribute or property that can be used to describe or classify various types of information communicated between devices in BMS 400.

Figure 11:
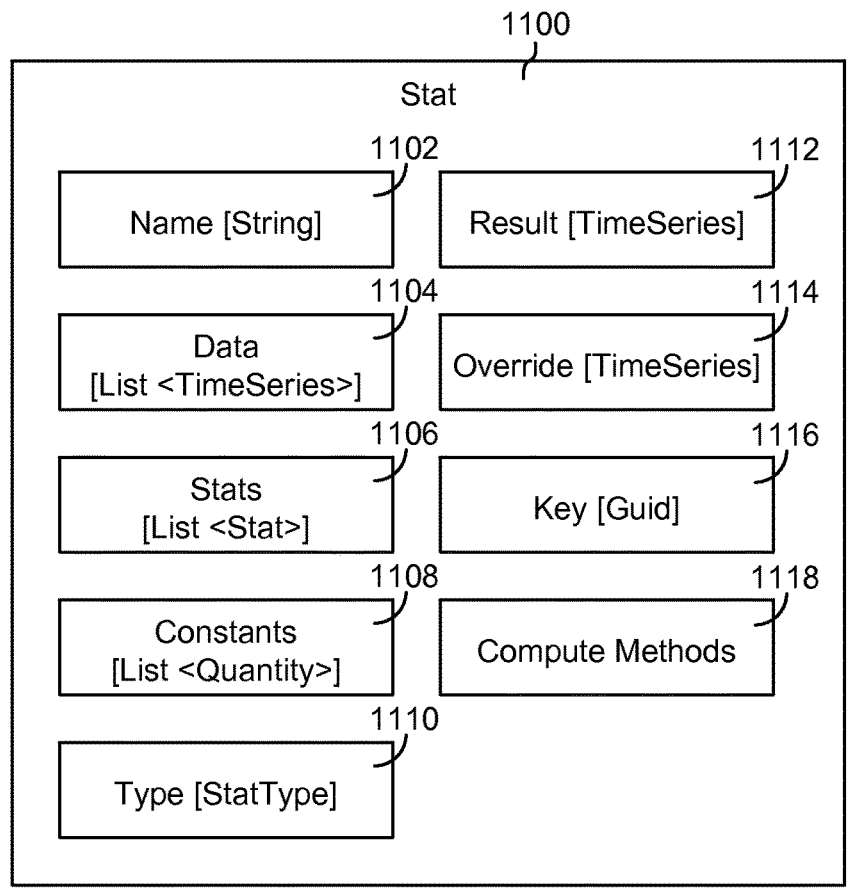
FIG. 11 is a block diagram of a stat object which may be used to define a stat attribute of the template thermodynamic block of FIG. 9, according to an exemplary embodiment.

Referring now to FIG. 11, a stat object 1100 is shown, according to an exemplary embodiment. Stat object 1100 may provide detailed information about one of the stats listed in stats 920. In some embodiments, stat object 1100 is instantiated such that each of the stats listed in stats 920 corresponds to a unique stat object 1100. Stat object 1100 may define one or more of the calculations associated with thermodynamic block 900. For example, stat object 1100 may include equations, formulas, or other relationships that facilitate calculating the outputs from thermodynamic block 900 as a function of one or more inputs or other values.

Stat object 1100 may define a set of connections 918 and/or other values that are required as inputs to a particular formula to calculate a desired data value. If the required inputs to the formula are available within thermodynamic block 900 (e.g., received via connections 918, stored in internals 922, etc.), stat object 1100 may produce a value. Otherwise, stat object 1100 may remain null and indicate which values are missing. In some embodiments, stat object 1100 is identified by the stats 920 in atomic thermodynamic blocks and inherited by higher level thermodynamic blocks which contain the atomic thermodynamic block.

Stat object 1100 is shown to include a name 1102, a data list 1004, stats 1106, constants 1108, a stat type 1110, a result 1112, an override 1114, a key 1116, and compute methods 1118. Name 1102 may define a name for stat object 1100. The name may be provided by a user or automatically generated and may be stored as a text string. Data list 1104 may store a list of inputs to a particular calculation defined by stat object 1100. The inputs in data list 1104 may come from connections 918 and may be time series data. Stats 1106 may store a list of previously created stats. The stats listed in stats 1106 may identify other stat objects which may be used to calculate other values. Constants 1108 may store a list of quantities that are provided as constants to the calculation defined by stat object 1100. Constants 1108 may be hardcoded or provided from a thermodynamic block's internal data. Type 916 defines the type of stat object 1100 and identifies a particular formula or equation used by stat object 1100. In various embodiments, the equations or formulas may be stored within stat object 1100 or retrieved from an external data source. Result 1112 may store a result of the calculation as a time series data value. Override 1114 may store a forced override which replaces result 1112. Override 1114 may be used, for example, if a sensor can sample the value calculated by stat object 1100 or if another component of BMS 400 has already calculated result 1112. Key 1116 may define a unique GUID used for storage and mapping to outside sources. Compute methods 1118 may store a method used to gather all of the data and to call the calculation used to compute result 1112.

Stat object 1100 may function similar to how units are managed in the data model. For example, when result 1112 is requested, stat object 1100 may determine whether to recalculate result 1112. Determining whether to recalculate result 1112 may include determining whether any changes have occurred to the inputs upon which result 1112 is based (e.g., data 1104, constants 1108, etc.). If one or more of the inputs have changed, stat object 1100 may recalculate and update result 1112. However, if none of the inputs have changed, stat object 1100 may provide the previously cached value of result 1112 in response to the request.

Advantageously, stat object 1100 provides a simple and effective method for storing lambda functions for various simple memoryless calculations. The formulas used by stat object 1100 may be of the form $y=f(x, y, z)$, where x, y, and z are arrays of doubles used for data 1104, stats 1106, and constants 1108 respectively. The formula may be called once for each time stamp from the time series except the constant, which acts as a constant at any time stamp.

Figure 12:
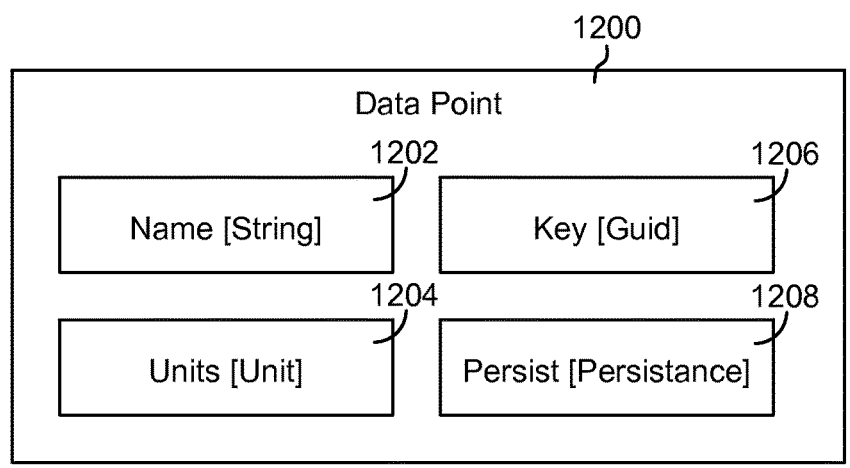
FIG. 12 is a block diagram of a data point object which may be used to define a data point attribute of the template thermodynamic block of FIG. 9, according to an exemplary embodiment.

Referring now to FIG. 12, a data point object 1200 is shown, according to an exemplary embodiment. Data point object 1200 may provide detailed information about one of the data points listed in internals 922. In some embodiments, data point object 1200 is instantiated such that each of the data points listed in internals 922 corresponds to a unique data point object 1200. Data point object 1200 may represent a point-driven aspect of the data model and may contain information that that is used by the HVAC equipment to determine an appropriate set of control actions.

Data point object 1200 is shown to include a name 1202, units 1204, a key 1206, and a persist attribute 1208. Name 1202 may define a name for data point object 1200. The name may be provided by a user or automatically generated and may be stored as a text string. Units 1204 may identify the units that the data point represents (e.g., ° C., ° F., kPa, Joules, BTUs, etc.). In some embodiments, thermodynamic block 900 checks user preferences for units and compares them against the current units of the data point specified in units 1204. If the data point differs in units to the preferences, the data point may be converted to the desired units, saved, and/or provided in the converted units. Key 1206 may define a unique GUID used for storage and mapping to outside sources. Persist attribute 1208 may identify whether the value of the data point can be read and/or written to a database. The persist attribute 1208 may define whether the data point is persisted through the database.

Figure 13:
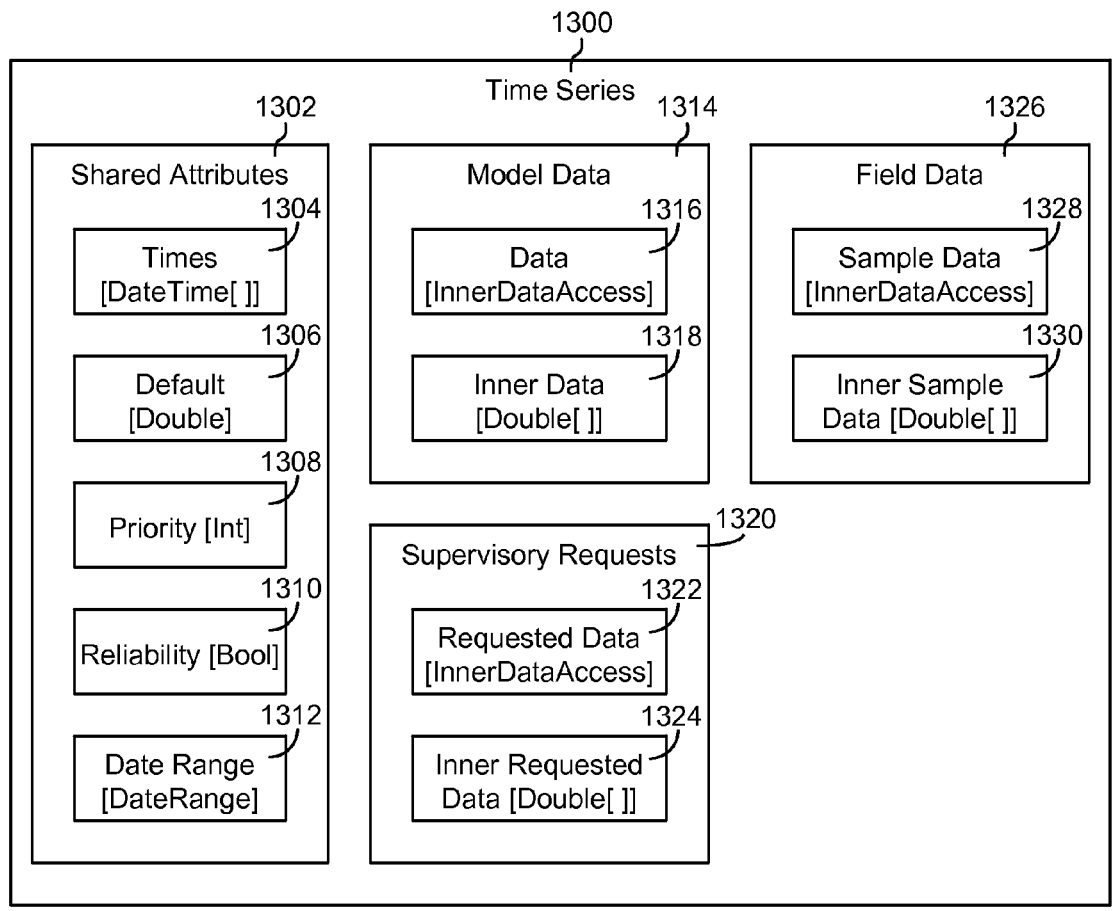
FIG. 13 is a block diagram of a time series object which may be used to define a time series attribute of the stat object of FIG. 11, according to an exemplary embodiment.

Referring now to FIG. 13, a time series object 1300 is shown, according to an exemplary embodiment. Time series object 1300 may be used to capture and persist time series data in BMS 400 and may include any number of data-time pairs. Time series object 1300 may store time series data for any type of data having a time series attribute. For example, time series object 1300 may store time series data for stats data 1104, result 1112, override 1114, or any other data point that can change over time. In some embodiments, time series object 1300 is instantiated such that each of the time series listed in data 1104 corresponds to a unique instance of time series object 1300. Time series object 1300 may provide the data values used to perform the various calculations defined by stat object 1100.

Time series object 1300 is shown to include three primary categories of data: field data 1326, model data 1314, and supervisory requests 1320. Field data 1326 may include data samples provided by BMS 400 or various components thereof. For example, field data 1326 may include data values that are measured by sensors or calculated based on measured values. Field data 1326 may also include data values that are received from an external data source (e.g., time-varying energy prices, weather data, etc.). Field data 1326 is shown to include a sample data module 1328 and inner sample data 1330. Sample data module 1328 may identify the get and set access for inner sample data 1330. Sample data module 1328 may be configured to check the units of inner sample data 1330 in response to a request for inner sample data 1330 and convert inner sample data 1330 to different units if necessary. Sample data module 1328 may also indicate whether inner sample data 1330 has changed since the last time inner sample data 1330 was requested. If inner sample data 1330 has not changed, the stats based on inner sample data 1330 may not require updating. Inner sample data 1330 stores the actual values of the data samples in field data 1326.

Model data 1314 may include data samples that are produced by the mathematics of the data model. For example, model data 1314 may include result 1112 calculated using stat object 1100. Model data 1314 is shown to include a data module 1316 and inner data 1318. Data module 1316 may identify the get and set access for inner data 1318. Data module 1316 may be configured to check the units of inner data 1318 in response to a request for inner data 1318 and convert inner data 1318 to different units if necessary. Data module 1316 may also indicate whether inner data 1318 has changed since the last time inner data 1318 was requested. If inner data 1318 has not changed, the stats based on inner data 1318 may not require updating. Inner data 1318 stores the actual values of the data samples in model data 1314.

Supervisory requests 1320 may include outputs from various control that interact with the data model. For example, supervisory requests 1320 may include a setpoint or control output from a supervisory controller. Supervisory requests 1320 may indicate that the supervisory controller would like to change the value of model data 1314 and/or field data 1326 to the value specified in supervisory requests 1328. Supervisory requests 1320 is shown to include a requested data module 1322 and inner requested data 1324. Requested data module 1322 may identify the get and set access for inner requested data 1324. Requested data module 1322 may be configured to check the units of inner requested data 1324 in response to a request for inner requested data 1324 and convert inner requested data 1324 to different units if necessary. Requested data module 1322 may also indicate whether inner requested data 1324 has changed since the last time inner requested data 1324 was requested. If inner requested data 1324 has not changed, the stats based on inner requested data 1324 may not require updating. Inner requested data 1324 stores the actual values of the data samples in supervisory requests 1320.

Still referring to FIG. 13, time series object 1300 is shown to include shared attributes 1302. Shared attributes 1302 may apply to any type of time series data that can be stored in time series object 1300 (e.g., field data 1326, model data 1314, and/or supervisory requests 1320). Shared attributes 1302 are shown to include times 1304, default value 1306, priority 1308, reliability 1310, and a date range 1312. Times 1304 may store an array of times that are present in the system. In some embodiments, times 1304 stores a time for each data sample in the time series data. Default value 1306 may provide a default value for the time series data if no other values of the time series data are available. Priority 1308 may store a priority from BMS 400 used to write or read the time series data. Reliability 1310 may store a reliability indicator from BMS 400 used to identify whether the time series data was reliable at the time of sampling. Date range 1312 may store a static variable used to define the range of data collected by time series object 1300.

Figure 14:
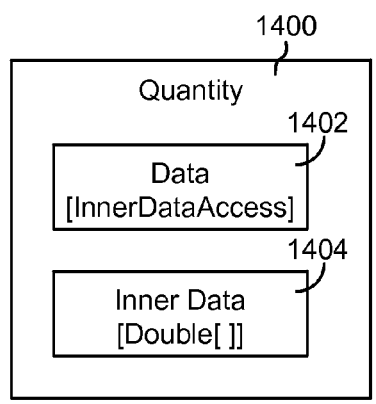
FIG. 14 is a block diagram of a quantity object which may be used to define a constraints attribute of the stat object of FIG. 11, according to an exemplary embodiment.

Referring now to FIG. 14, a quantity object 1400 is shown, according to an exemplary embodiment. Quantity object 1400 may store non-time series data used by thermodynamic block 900 and/or stat object 1000. For example, quantity object 1400 may store configuration data, model parameters, constant values, or other types of data that do not vary as a function of time. In some embodiments, quantity object 1400 provides detailed information about one of the constants listed in constants 1108. Quantity object 1400 may be instantiated such that each of the constants listed in constants 1108 corresponds to a unique instance of quantity object 1400.

Quantity object 1400 is shown to include a data module 1402 and inner data 1404. Data module 1402 may identify the get and set access for inner data 1404. Data module 1402 may be configured to check the units of inner data 1404 in response to a request for inner data 1404 and convert inner data 1404 to different units if necessary. Data module 1402 may also indicate whether inner data 1404 has changed since the last time inner data 1404 was requested. If inner data 1404 has not changed, the stats based on inner data 1404 may not require updating. Inner data 1404 stores the actual values of the data in constants object 1400.

Referring now to FIGS. 15-18, a sample implementation of the thermodynamic data model described with reference to FIGS. 9-14 is shown, according to an exemplary embodiment. Referring particularly to FIG. 15, a block diagram illustrating a thermodynamic data model 1500 of a chiller plant is shown. Data model 1500 is shown to include several thermodynamic blocks 1502-1518. Each of blocks 1502-1518 may be an instance of thermodynamic block 900, as described with reference to FIG. 9. The blocks in model 1500 that do not encapsulate any other blocks are atomic thermodynamic blocks which model lowest level building equipment and other low level objects. The other blocks in model 1500 are higher level (i.e., non-atomic) thermodynamic blocks which model systems or subsystems containing one or more atomic thermodynamic blocks.

The atomic thermodynamic blocks are shown to include an electricity supply block 1506, an atmosphere block 1508, a chiller block 1510, a cooling tower block 1512, a first pump block 1514, a second pump block 1516, and a load block 1518. Some of atomic thermodynamic blocks 1506-1518 model individual HVAC devices. For example, chiller block 1510 may model a chiller, tower block 1512 may model a cooling tower, and pump blocks 1514-1516 may model fluid pumps. Other atomic thermodynamic blocks model entities that interact with one or more of thermodynamic blocks 1502-1518. For example, electricity supply block 1506 may model an electric utility provider that supplies electricity to the chiller, cooling tower, and pumps. Atmosphere block 1508 may model the ambient environment (e.g., weather, temperature, humidity, etc.) surrounding the cooling tower. Load block 1518 may model a building or other entity to which chiller plant delivers a chilled fluid. For each of atomic thermodynamic blocks 1506-1518, the sub-blocks attribute 914 may be empty since none of the atomic thermodynamic blocks 1506-1518 contain any sub-blocks.

The non-atomic thermodynamic blocks are shown to include a chiller plant block 1504 and a global model block 1502. Chiller plant block 1504 contains chiller block 1510, tower block 1512, and pump blocks 1514-1516. Therefore, the sub-blocks attribute 914 for chiller plant block 1504 may list chiller block 1510, tower block 1512, and pump blocks 1514-1516. Global model block 1502 contains chiller plant block 1504, electricity supply block 1506, atmosphere block 1508, and load block 1518. Therefore, the sub-blocks attribute 914 for global model block 1502 may list chiller plant block 1504, electricity supply block 1506, atmosphere block 1508, and load block 1518.

Still referring to FIG. 15, data model 1500 is shown to include several connections 1-8 connecting thermodynamic blocks 1504-1518. Connections 1-8 may be specified by their node ID attribute 1004 in data model 1500. Connection 1 connects electricity supply block 1506 to chiller plant block 1504. Within chiller plant block 1504, connection 1 connects to chiller block 1510, tower block 1512, and pump blocks 1514-1516. Connection 2 connects chiller block 1510 to pump block 1514. Connection 3 connects pump block 1514 to load block 1518. Connection 4 connects chiller block 1510 to load block 1518. Connection 5 connects chiller block 1510 to pump block 1516. Connection 6 connects tower block 1512 to pump block 1516. Connection 7 connects chiller block 1510 to tower block 1512. Connection 9 connects atmosphere block 1508 to tower block 1512.

Referring now to FIG. 16, a net list 1600 defining the connections 1-8 shown in data model 1500 is shown, according to an exemplary embodiment. Net list 1600 is shown as a data table including a key column 1602 and a value column 1604. Key column 1602 may identify each of the thermodynamic blocks in data model 1500 that are connected to other thermodynamic blocks. For example, key column 1602 is shown listing electricity supply block 1506, atmosphere block 1508, chiller block 1510, cooling tower block 1512, first pump block 1514, second pump block 1516, load block 1518, and chiller plant block 1504. However, key column 1602 may not list global model block 1502 since no connections pass through the boundary of global model block 1502. Value column 1604 indicates which of connections 1-8 apply to each of the thermodynamic blocks listed in key column 1604. For example, value column 1604 specifies that electricity supply block 1506 has connection 1, atmosphere block 1508 has connection 8, etc.

Referring now to FIG. 17, a net descriptions table 1700 describing the connections 1-8 defined in net list 1600 is shown, according to an exemplary embodiment. Net descriptions table 1600 is shown as a data table including a key column 1702 and a value column 1704. Key column 1702 may identify each of the thermodynamic blocks in data model 1500 that are connected to other thermodynamic blocks. Value column 1704 may provide a description for each of the connections defined in net list 1600.

The listing of descriptions in value column 1704 may be arranged in the same order as the listing of connections in value column 1604 such that a direct mapping can be applied. For example, value column 1604 indicates that chiller block 1510 has connections "1," "4," "2," "7" and "5." Value column 1704 indicates that chiller block 1510 has connections "ElecIn," "EvapIn," "EvapOut," "CondIn," and "CondOut." This indicates that connection "1" is an electrical connection into chiller block 1510, connection "4" is an evaporator connection into chiller block 1510, connection "2" is an evaporator connection out of chiller block 1510, connection "7" is a condenser connection into chiller block 1510, and connection "5" is a condenser connection out of chiller block 1510.

In some embodiments, each of the descriptions in value column 1704 includes an indication of whether the connection is an inbound connection or an outbound connection relative to the associated thermodynamic block. Directionality indications may be provided by a text string in the description value (e.g., "in" or "out"), by another column that explicitly lists the directionality of the connection, or by any other indication that can be provided in net descriptions table 1700. In other embodiments, the directionality of each connection is indicated by the side of the thermodynamic block to which the connection is attached (e.g., to the inbound side or outbound side of the thermodynamic block).

Referring now to FIG. 18, an all connections table 1800 is shown, according to an exemplary embodiment. All connections table 1800 is shown as a data table having an ID column 1802 and a name column 1804. ID column 1802 may specify the node ID 1004 for each of the connections 1-8 shown in data model 1500. Name column 1804 may include text strings that assign a name to each of the node IDs. The names may be the same or different from the text strings describing each connection in net descriptions table 1700. In some embodiments, all connections table 1800 lists all of the connections in data model 1500 in a form that can be easily parsed by a user to understand what each of the connections signifies (e.g., whether the connection is an electric connection, a fluid connection, a data connection, etc.).

Advantageously, the graphical representation of the data model shown in FIG. 15 and tables 1600-1800 may provide all of the information required to construct data model 1500. The attributes of each thermodynamic block in data model 1500 can also be used to independently construct data model 1500. For example, the sub-block attributes 914 and connection attributes 918 of each thermodynamic block can be used to construct data model 1500 or a portion thereof. In some embodiments, data model 1500 is distributed across multiple HVAC devices with each HVAC device storing one or more of the thermodynamic blocks relevant to the HVAC device. For example, a chiller may store chiller block 1510, whereas controller for the chiller plant may store chiller plant block 1504. The controller may request chiller block 1510 from the chiller if the information contained in chiller block 1510 is needed for a calculation performed by the controller. This functionality is described in greater detail with reference to FIG. 19.

Figure 19:
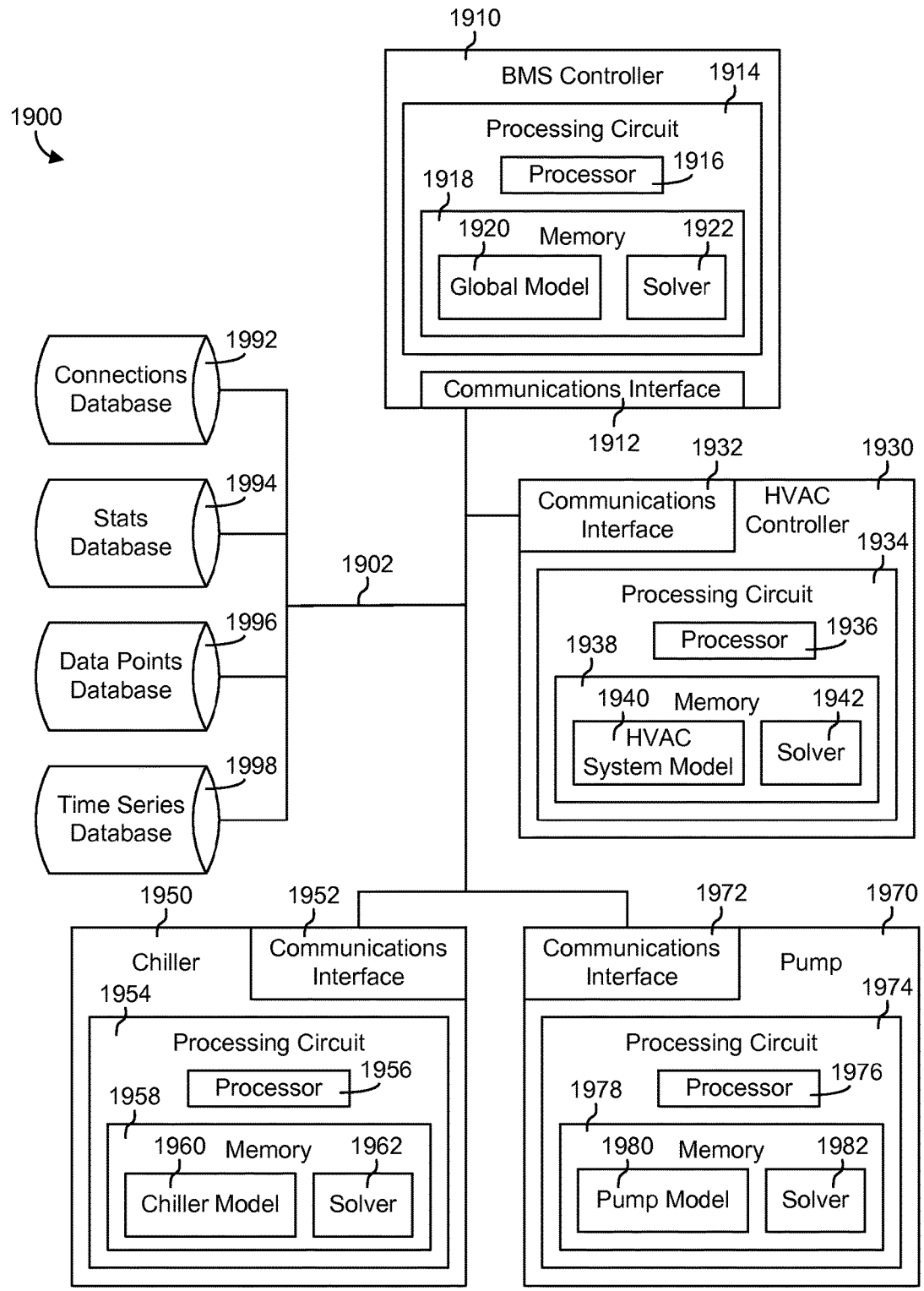
FIG. 19 is a block diagram of a BMS including a plurality of BMS devices, each of which stores a thermodynamic block representing the BMS device or a system controlled by the BMS device and includes a solver module configured to solve equations defined by the thermodynamic block, according to an exemplary embodiment.

Referring now to FIG. 19, a block diagram of a building management system (BMS) 1900 configured to use the thermodynamic data model described with reference to FIGS. 9-18 is shown, according to an exemplary embodiment. Although only a few BMS devices are shown in FIG. 19, it is understood that BMS 1900 may include any number and/or type of BMS devices. For example, BMS 1900 may be the same or similar to BMS 400, as described with reference to FIG. 4. BMS 1900 is shown to include a BMS controller 1910, a HVAC controller 1930, a chiller 1950, and a pump 1970. BMS controller 1910 may be a top level controller for BMS 1900 and may be configured to monitor and control a plurality of building subsystems (e.g., a fire safety system, a lift/escalator system, an electrical system, a security system, a HVAC system, a lighting system, etc.), as described with reference to FIG. 4. HVAC controller 1930 may be a system or subsystem level controller and may be configured to control a HVAC system within BMS 1900. Chiller 1950 and pump 1970 may be lowest level devices within the HVAC system and may be controlled by HVAC controller 1930.

Each of BMS devices 1910, 1930, 1950, and 1970 is shown to include a communications interface (i.e., communications interfaces 1912, 1932, 1952, and 1972) and a processing circuit (i.e., processing circuits 1914, 1934, 1954, and 1974). Communications interfaces 1912, 1932, 1952, and 1972 may be the same or similar to interfaces 407 and/or 409 (as described with reference to FIG. 4) and may be configured to facilitate electronic data communications between the components of BMS 1900 and/or external systems or devices. In various embodiments, the communications may be direct (e.g., local wired or wireless communications) or via a communications network 1902 (e.g., a WAN, the Internet, a cellular network, etc.). Each communications interface may be communicably connected to the processing circuit of the corresponding BMS device such that the processing circuit and the various components thereof can send and receive data via the communications interface.

Each of processing circuits 1914, 1934, 1954, and 1974 is shown to include a processor (i.e., processors 1916, 1936, 1956, and 1976) and memory (i.e., memory 1918, 1938, 1958, and 1978). Processors 1916, 1936, 1956, and 1976 can be implemented as general purpose processors, application specific integrated circuits (ASICs), one or more field programmable gate arrays (FPGAs), a group of processing components, or other suitable electronic processing components. Memory 1918, 1938, 1958, and 1978 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 1918, 1938, 1958, and 1978 may be or include volatile memory, non-volatile memory, database components, object code components, script components, or any other type of information structure for supporting the various activities and information structures described in the present application. According to an exemplary embodiment, each memory 1918, 1938, 1958, and 1978 is communicably connected to the processor of the corresponding BMS device via the processing circuit and includes computer code for executing (e.g., by the processing circuit and/or the processor) one or more processes described herein.

As shown in FIG. 19, the thermodynamic data model may be distributed across multiple BMS devices. For example, chiller 1950 is shown storing a chiller model 1960 within the local memory 1958 of chiller 1950 and pump 1970 is shown storing a pump model 1980 within the local memory 1978 of pump 1970. Chiller model 1960 and pump model 1980 may be instances of thermodynamic block 900 representing chiller 1950 and pump 1970, respectively. For example, chiller model 1960 may be an atomic thermodynamic block (e.g., chiller block 1510) modeling chiller 1950, whereas pump model 1980 may be an atomic thermodynamic block (e.g., pump block 1514) modeling pump 1970. Each of the lowest level devices in BMS 1900 may store an instance of thermodynamic block 900 representing the device.

In some embodiments, one or more higher level devices in BMS 1900 also store a portion of the thermodynamic data model. For example, HVAC controller 1930 is shown storing a HVAC system model 1940 within the local memory 1930 of HVAC controller 1930. HVAC system model 1940 may be an instance of thermodynamic block 900 representing a HVAC system or portion thereof (e.g., chiller plant block 1504) and may list both chiller block 1510 and pump block 1514 as sub-blocks 914. BMS controller 1910 is shown storing a global model 1920 within the local memory 1918 of BMS controller 1910. Global model 1920 may be an instance of thermodynamic block 900 representing the entirety of BMS 1900 (e.g., global model block 1502) and may list chiller plant block 1504 as a sub-block 914.

In some embodiments, the devices in BMS 1900 are configured to transmit their stored thermodynamic blocks to higher level devices in response to a request from the higher level devices. For example, HVAC controller 1930 may request chiller model 1960 from chiller 1950 and/or pump model 1980 from pump 1970. In response to a request from HVAC controller 1930, chiller 1950 may transmit chiller model 1960 to HVAC controller 1930 and pump 1970 may transmit pump model 1980 to HVAC controller 1930. HVAC controller 1930 may use chiller model 1960 and pump model 1980 to update HVAC system model 1940. Similarly, BMS controller 1910 may request HVAC system model 1940 from HVAC controller 1930. In response to a request from BMS controller 1910, HVAC controller 1930 may transmit HVAC system model 1940 to BMS controller 1910. BMS controller 1910 may use HVAC system model 1940 to update global model 1920.

One benefit of the distributed thermodynamic data model shown in FIG. 19 is that each BMS device can perform calculations relating to its own operation and/or performance using local processing hardware. For example, chiller 1950 may use processing circuit 1954 and chiller model 1960 to perform calculations relating to the operation or performance of chiller 1950. Similarly, pump 1970 may use processing circuit 1974 and pump model 1980 to perform calculations relating to the operation or performance of pump 1970. The calculations may be performed by multiple BMS devices in parallel and may use data locally available to the device. For example, the calculations performed by a particular BMS device may use the thermodynamic block stored within the local memory of the device and/or data points sampled or calculated locally. Advantageously, this distributed processing framework allows for high local data sample rates and fast local control loops without exhausting network communications resources.

In some embodiments, the calculations performed by each BMS device in BMS 1900 are based on the stats 920 defined by the instance of thermodynamic block 900 stored within the memory of the BMS device. For example, the calculations performed by chiller 1950 may be based on the stats 920 defined by chiller model 1960, whereas the calculations performed by pump 1970 may be based on the stats 920 defined by pump model 1980. The stats 920 may be stored locally (e.g., within the local memory of the BMS device) or retrieved from a stats database 1994. For example, stats database 1994 may store a plurality of stat objects 1000 that define each of the listed stats 920.

In various embodiments, the results of the calculations may be stored locally, stored as results 1112 in stats database 1994, and/or provided directly to other BMS devices. This feature allows higher level BMS devices to obtain the results of a lower level calculation and to use such results in a higher level model without requiring the higher level BMS device to be aware of the details of the lower level model or the stat 920 used to perform the lower level calculation. For example, HVAC controller 1930 can obtain the result of a calculation performed by chiller 1950 and apply the result to HVAC system model 1940 without requiring HVAC controller 1930 to be aware of the details of chiller model 1960 and/or the stat 920 used by chiller 1950 to calculate the result.

In some embodiments, slower sample rates and slower control loops with more complex control algorithms are executed on higher level BMS devices such as HVAC controller 1930 and/or BMS controller 1910. Controllers 1910 and 1930 may be configured to communicate efficiently with lower level BMS devices. For example, chiller 1950 and pump 1970 may be configured to cache data and send large blocks of data to higher level devices until the data reaches the highest level of the data model and the entire model is reassembled. This type of communication allows for robust fault detection and diagnostics within BMS 1900 at the highest level of the data model.

In some embodiments, the time series data 1104 used by the stats 920 listed in each thermodynamic block are replicated or stored in a time series database 1998 (e.g., as time series objects 1300) and made available to all of the devices of BMS 1900. Similarly, the data points listed in each of the thermodynamic blocks as internals 922 may be stored in a data points database 1996 (e.g., as data point objects 1200) and the connections listed in each of the thermodynamic blocks as connections 918 may be stored in a connections database 1992 (e.g., as connection objects 1000). Each of databases 1992-1998 may be accessible via network 1902 such that the data stored in databases 1992-1998 are available to all of the devices of BMS 1900.

Still referring to FIG. 19, each of BMS devices 1910, 1930, 1950, and 1970 is shown to include a solver (i.e., solvers 1922, 1942, 1962, and 1982). Each solver may be configured to use one or more thermodynamic blocks of the data model to calculate or estimate data points that are not sampled in BAS 1900. Solvers 1922, 1942, 1962, and 1982 may be configured to perform real time calculations and/or batch calculations. Real time calculations may include using the stats 920 defined by various thermodynamic blocks to calculate results 1112. For example, solver 1942 within HVAC controller 1930 may use the stats 920 defined by HVAC system model 1940 to calculate results 1112 of stats 920. Solver 1942 may calculate results 1112 in real time based on time series data 1104 available to solver 1942. Batch calculations may include solving the pressure loops within the HVAC system or running an advance algorithm inside BMS controller 1910. Each of solvers 1922, 1942, 1962, and 1982 may operate in a similar manner to calculate results 1112 for each of the stats 920 defined by various thermodynamic blocks of data model.

In some embodiments, one or more of solvers 1922, 1942, 1962, and 1982 includes a real time solver. The real time solver may use real-world data samples (e.g., time series data) in conjunction with defined thermodynamic blocks to solve for unknown values in BMS 1900. For example, if a thermodynamic block models fluid flow through a length of pipe and the data samples obtained from BMS 1900 provide the input and output temperatures and pressures of the fluid flow, the real time solver can solve for the loss of heat and/or pressure loss in the pipe. As another example, a collection of thermodynamic blocks and connections may model fluid flow from an evaporator to an air handling unit in a HVAC system. If the state of the fluid at the output of the evaporator is known and state of the input fluid to the air handling unit is known, the real time solver can solve the system to determine where, if any, temperature or pressure was lost.

The results of the calculations performed by the real time solver can be provided as a "virtual sensor," stored along with the measured values, and/or provided as a data output to a user. In some embodiments, the real time solver uses fully-defined thermodynamic blocks to solve for unknown values. If a thermodynamic block is not fully defined, the real time solver may output an indication that additional definition and/or inputs are required to solve for the desired values. In other embodiments, the real time solver uses system identification (e.g., regression of a system model from empirical data) to generate a model for the system and define the thermodynamic block.

In some embodiments, one or more of solvers 1922, 1942, 1962, and 1982 includes a batch solver. The batch solver may be configured to perform batch calculations using one or more thermodynamic blocks of the thermodynamic data model. For example, the batch solver may be configured to solve a pressure loop for the HVAC system. Solving a pressure loop may include identifying a known pressure in the HVAC system (e.g., a pressure ground) and traversing from the known pressure through a network of defined connections within the thermodynamic data model until all of the pressures in the HVAC system have been solved. If too few pressure samples or constraints are provided in the data model, the batch solver may output a notification that the pressure loop cannot be solved based on the provided information. The batch solver may identify one or more data points that, if measured, would allow the batch solver to solve the pressure loop and present such data points to a user as suggested measurements or system improvements.

As another example, the batch solver may be configured to run a simulation using the thermodynamic data model. If the thermodynamic data model represents a plant, the batch solver may use the data model to simulate how the plant would operate into the future. Inputs to the batch solver may include an indication of a desired performance attribute (e.g., energy consumption, temperature, cooling load, etc.) and one or more time series variables that are relevant to the desired performance attribute (e.g., weather, building loads, energy prices, etc.). Using the batch solver to run simulations allows a user to define real or hypothetical scenarios and simulate the effects of each scenario. For example, a user can define a hypothetical scenario which simulates the impact of adding an additional chiller or new piping to an existing plant.

The operations performed by solvers 1922, 1942, 1962, and 1982 may be similar when used as a real time solver or a batch solver. For example, solvers 1922, 1942, 1962, and 1982 may receive, as an input, a system model (e.g., model 800, model 1500) including one or more linked thermodynamic blocks 900. Solvers 1922, 1942, 1962, and 1982 may identify connections 918, sub-blocks 914, stats 920, data points (e.g., time series data 1104), and/or internals 922 listed within each of the thermodynamic blocks. Connections 918 and sub-blocks 914 may impose constraints on the solver (e.g., constraining the input to one block to the output of another block). Stats 920 may define the data points that are required to solve for the desired variable. If one or more required data points are missing, solvers 1922, 1942, 1962, and 1982 may report that insufficient data points are available. In some embodiments, solvers 1922, 1942, 1962, and 1982 identify and report the missing data points to a user.

Advantageously, the thermodynamic data model described herein can be used to model a wide variety of thermodynamic systems, regardless of the inputs to the system model. For example, the system model can be constructed without considering the actual sensors and/or data points measured in the actual thermodynamic system. This allows the system model to be developed independent from the collection of data (e.g., via sensor placement) in the actual thermodynamic system. For a system model with very few sensors and connections between thermodynamic blocks, most of the variables that could potentially be modeled may be undefined (e.g., unconstrained by the model) and the predictive capabilities of the model may be limited. As more sensors and/or connections are added to the system model, an increasing number of variables may become fully defined (e.g., constrained) and can be predicted by the model.

In some embodiments, solvers 1922, 1942, 1962, and 1982 are configured to identify one or more data points or connections that, if defined, would provide additional functionality to the system model. Defining a data point may include installing a sensor to measure the data point or defining a stat to calculate the data point. Defining a connection may include establishing or fully defining a link between two or more thermodynamic blocks in the model. In some embodiments, solvers 1922, 1942, 1962, and 1982 provide the user with a cost-benefit analysis of adding additional complexity to the model. For example, solvers 1922, 1942, 1962, and 1982 may present the user with a list of sensors that could be added and/or connections that could be defined to provide additional functionality to the system model. The list may include an estimated cost of each sensor and/or connection that could be added. Advantageously, solvers 1922, 1942, 1962, and 1982 can report the costs and benefits of various actions that would add more definition to the system model. For example, solvers 1922, 1942, 1962, and 1982 may report that if the user spends X more dollars adding a sensor or further configuring the data model, the model will then be capable of providing feature Y. This allows the user to pick and choose features in a plug-and-play manner by assessing the costs and benefits of additional model definition.

Figure 20:
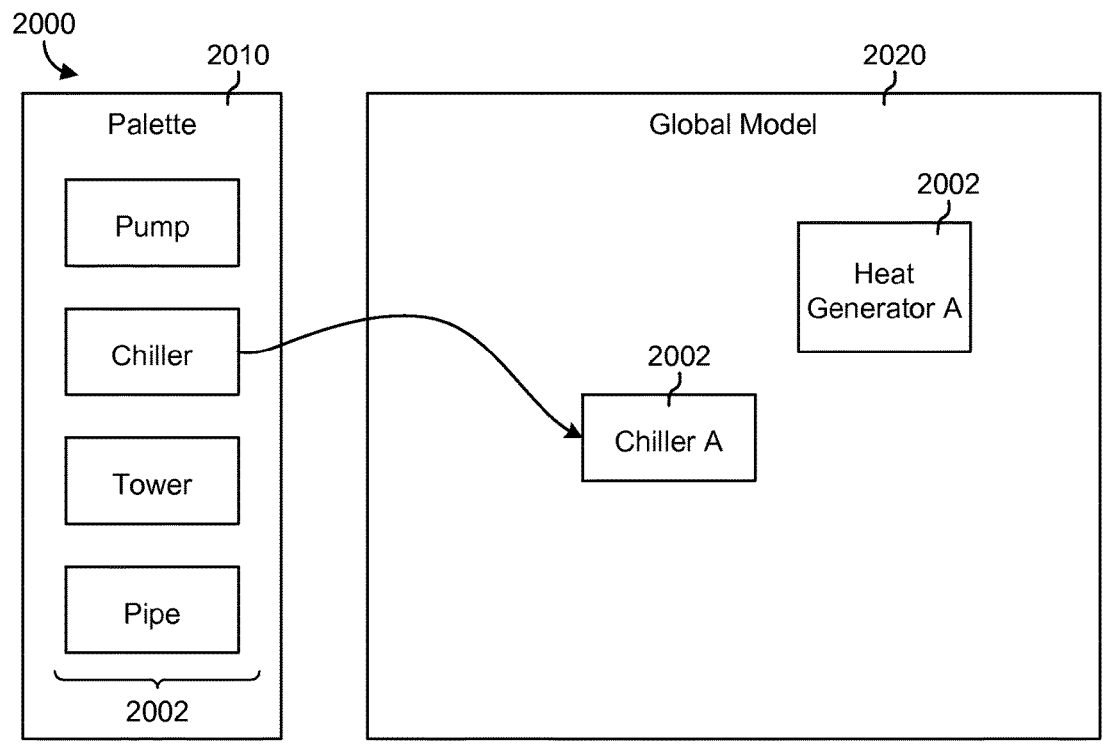
FIG. 20 is a drawing of a user interface which may be used to generate the thermodynamic model of FIG. 15, according to an exemplary embodiment.
Figure 21:
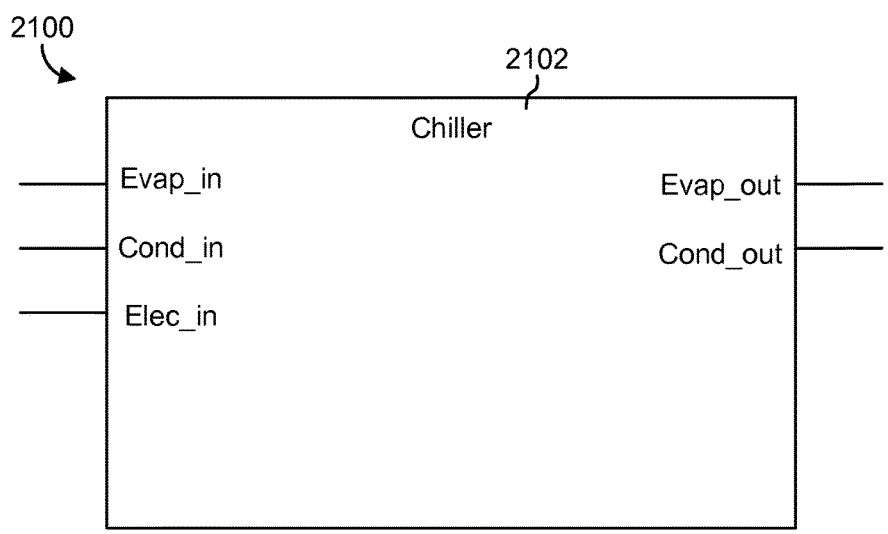
FIG. 21 is a drawing of a user interface which may be used to define the connections between the thermodynamic blocks in the thermodynamic model of FIG. 15, according to an exemplary embodiment.

Referring now to FIGS. 20-21, a user interface 2000 for configuring the thermodynamic data model described with reference to FIGS. 5-19 is shown, according to an exemplary embodiment. Configuration of the thermodynamic data model may be accomplished by dragging and dropping template thermodynamic blocks 2002 from a palette 2010 into a global model 2020 (e.g., via a user input device). Each of thermodynamic blocks 2002 may be an instance of thermodynamic block 900, as described with reference to FIG. 9. Palette 2010 may include any number and/or types of atomic thermodynamic blocks or non-atomic thermodynamic blocks (e.g., assemblies) that can be used to represent various systems or devices in the global model 2020. For example, palette is shown to include thermodynamic blocks 2002 representing pumps, chillers, towers, pipes, etc. Connections between thermodynamic blocks 2002 may be defined by drawing lines connecting thermodynamic blocks 2002 in global model 2020. The various attributes of each thermodynamic block 2002 (e.g., name 908, key 910, stats 920, internals 922, etc.) can also be defined via user interface 2000.

Referring particularly to FIG. 2100, an interface 2100 for defining the inputs and outputs of thermodynamic blocks 2002 in global model 2020 is shown, according to an exemplary embodiment. Interface 2100 shows a chiller block 2102, which may be one of thermodynamic blocks 2002 in global model 2020. Once chiller block 2102 has been placed in global model 2020, connections can be defined by drawing lines between chiller block 2102 and other thermodynamic blocks 2002 in global model 2020. Inputs to chiller block 2102 may be specified by attaching the connection to the input side 2104 of chiller block 2102, whereas outputs from chiller block 2102 may be specified by attaching the connection to the output side 2106 of chiller block 2102. Once the global model 2020 has been created and the connections have been defined, BMS controller 1910 may automatically generate a net list 1600, a net descriptions table 1700, and/or an all connections table 1800 describing global model 2020. Global model 2020 may be stored within the local memory of BMS controller 1900 and/or distributed to various components of BMS 1900, as described with reference to FIG. 19.

Referring now to FIGS. 22-25, several flowcharts illustrating processes 2200-2500 that use the thermodynamic data models described with reference to FIGS. 5-21 are shown, according to an exemplary embodiment. Processes 2200-2500 may be performed by a solver module of a BMS device (e.g., solvers 1922, 1942, 1962, and 1982) to calculate values that are not sampled by BMS equipment to provide more optimal control. In various embodiments, processes 2200-2500 may be performed by atomic BMS devices (e.g., pumps, chillers, etc.) or higher level BMS devices (e.g., field controllers, supervisory controllers, etc.).

Figure 22:
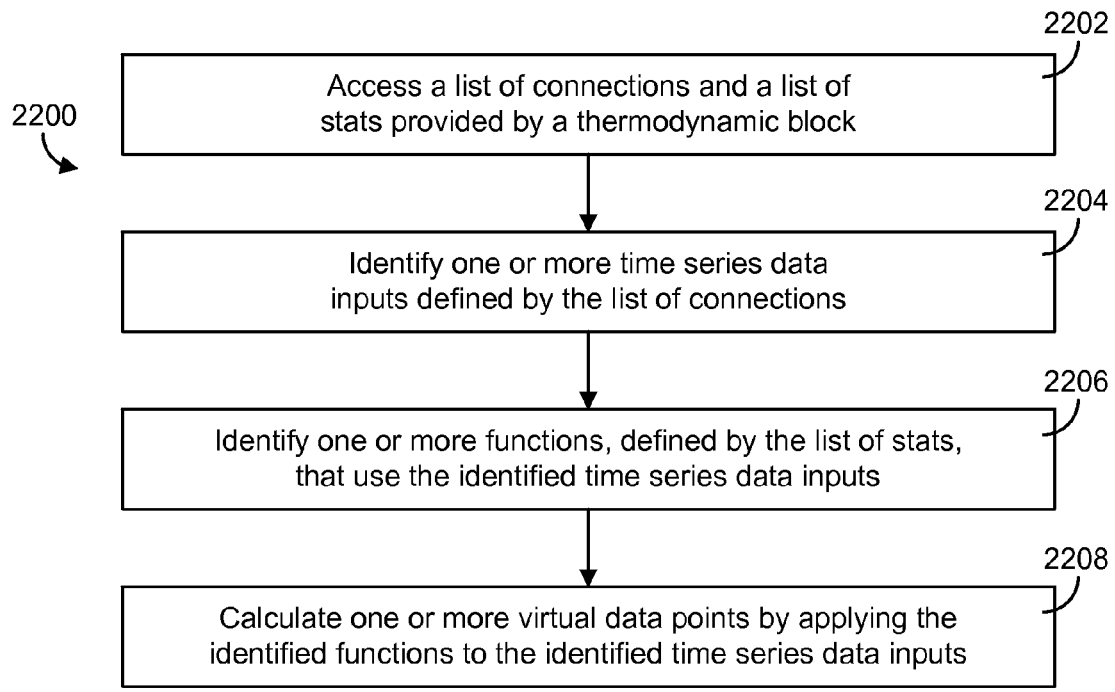
FIG. 22 is a flowchart of a process which may be performed by the solver module of FIG. 19 to calculate virtual data points based on measured time series data, according to an exemplary embodiment.

Referring particularly to FIG. 22, a process 2200 for calculating virtual data points based on measured time series data is shown, according to an exemplary embodiment. Advantageously, process 2200 may be used to determine values for one or more data points that are not measured by the building management system. Process 2200 is shown to include accessing a list of connections and a list of stats provided by a thermodynamic block (step 2202). The list of connections may be provided as a connections attribute 918 of the thermodynamic block (e.g., thermodynamic block 900) and the list of stats may be provided as a stats attribute 920 of the thermodynamic block.

Process 2200 is shown to include identifying one or more time series data inputs defined by the list of connections (step 2204) and identifying one or more functions that use the identified time series data inputs (step 2206). The time series data inputs may be real time data inputs measured by one or more sensors of the building management system. The functions that use the identified time series data inputs may be defined by the list of stats provided by the thermodynamic block.

Process 2200 is shown to include calculating one or more virtual data points by applying the identified functions to the identified time series data inputs (step 2208). Step 2208 may include using a stat object (e.g., stat object 1100) to map each of the time series data inputs to a particular variable in the identified function. The function can then be solved using the equations provided by the stat object to calculate a result. The result may be stored as an attribute of the stat object (e.g., as result 1112) and/or provided to other systems or devices for use in other calculations or reporting to a user.

Figure 23:
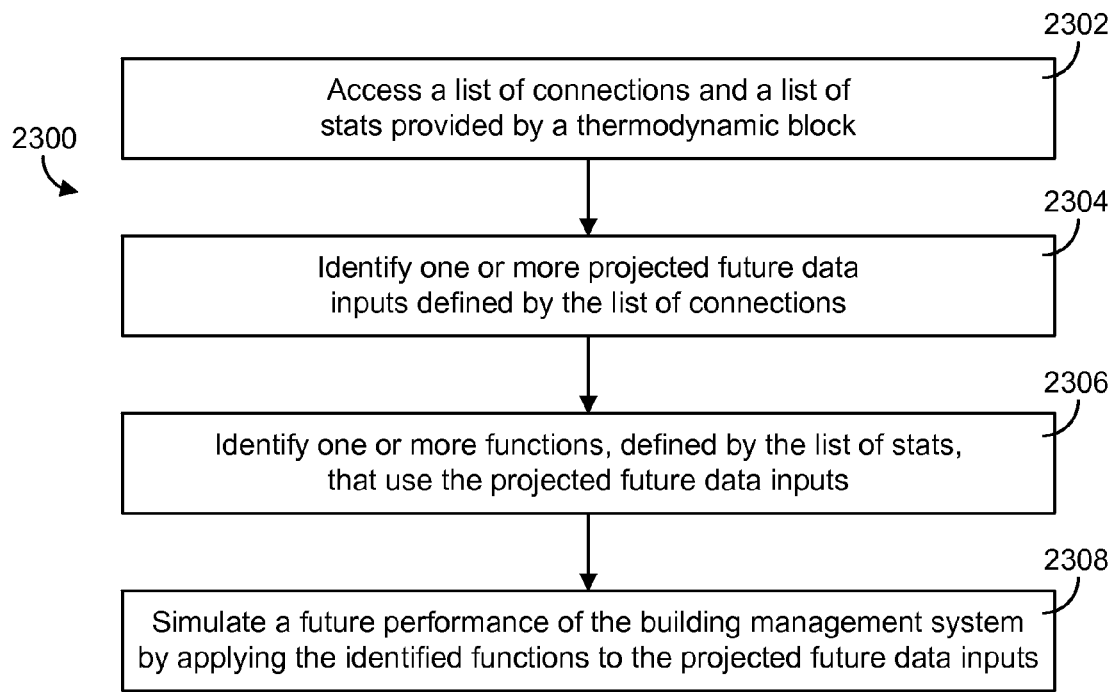
FIG. 23 is a flowchart of a process which may be performed by the solver module of FIG. 19 to simulate a future performance of the building management system, according to an exemplary embodiment.

Referring now to FIG. 23, a process 2300 for simulating the future performance of a building management system using thermodynamic data models is shown, according to an exemplary embodiment. Process 2300 is shown to include accessing a list of connections and a list of stats provided by a thermodynamic block (step 2302). The list of connections may be provided as a connections attribute 918 of the thermodynamic block (e.g., thermodynamic block 900) and the list of stats may be provided as a stats attribute 920 of the thermodynamic block.

Process 2300 is shown to include identifying one or more projected future data inputs defined by the list of connections (step 2304) and identifying one or more functions that use projected future data inputs (step 2306). The projected future data inputs may be estimated values for external variables such as weather conditions, energy prices, building load, etc. The functions that use the identified projected future inputs may be defined by the list of stats provided by the thermodynamic block.

Process 2300 is shown to include simulating a future performance of the building management system by applying the identified functions to the projected future data inputs (step 2308). Step 2308 may include using a stat object (e.g., stat object 1100) to map each of the projected future data inputs to a particular variable in the identified function. The function can then be solved using the equations provided by the stat object to calculate a result. The result may be stored as an attribute of the stat object (e.g., as result 1112) and/or provided to other systems or devices for use in other calculations or reporting to a user.

Figure 24:
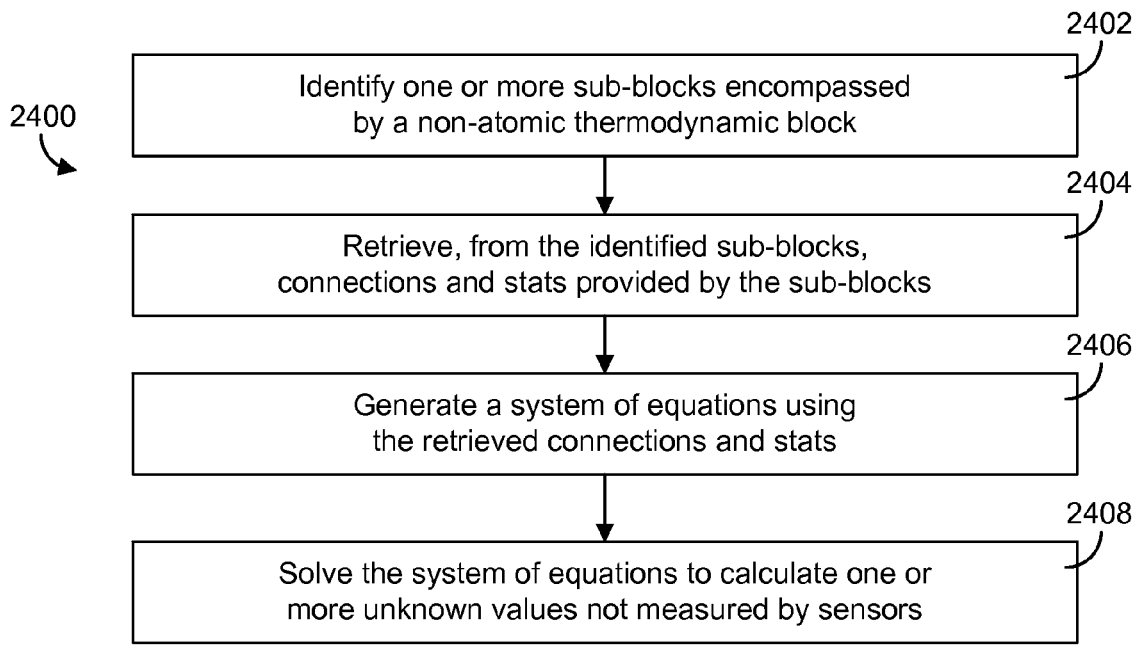
FIG. 24 is a flowchart of a process which may be performed by the solver module of FIG. 19 to generate and solve a system of equations using thermodynamic data models, according to an exemplary embodiment.

Referring now to FIG. 24, a process 2400 for generating and solving a system of equations using thermodynamic data models is shown, according to an exemplary embodiment. In some embodiments, process 2400 is performed by a controller or supervisory device in the building management system using a plurality of thermodynamic data models. Process 2400 is shown to include identifying one or more sub-blocks encompassed by a non-atomic thermodynamic block (step 2402). The encompassed sub-blocks may be identified by the sub-blocks attribute 914 of the thermodynamic block.

Process 2400 is shown to include retrieving, from the identified sub-blocks, connections and stats provided by the sub-blocks (step 2404). Step 2404 may include requesting the identified sub-blocks (or a portion of the sub-blocks) from one or more lower level BMS devices in which the sub-blocks are stored. The lower level BMS devices may respond to the request by sending a copy of their stored thermodynamic blocks to the higher level device requesting the thermodynamic blocks. In some embodiments, step 2404 includes retrieving one or more stat objects 1100 and/or one or more connection objects 1000 from an external database (e.g., stats database 1994, connections database 1992).

Process 2400 is shown to include generating a system of equations using the retrieved connections and stats (step 2406). The system of equations may include equations that define relationships between thermodynamic blocks based on the connections. The system of equations may also include equations that define relationships between the inputs and outputs of a thermodynamic block based on the stats. Some of the variables in the system of equations may have known values. For example, some of the variables may be measured by a sensor, specified as a constant parameter, and/or provided as an internal data point. Other variables in the system of equations may have unknown values.

Process 2400 is shown to include solving the system of equations to calculate one or more unknown values (step 2408). The unknown values may include values that are not measured by sensors or otherwise provided as known parameters. Any of a variety of computational techniques may be used to solve the system of equations (e.g., matrix calculations, linear algebra, etc.). In some embodiments, step 2408 is performed in real time by a processing circuit of a controller in the building management system (e.g., based on real time sensor data) and iteratively repeated each time new data is received.

Figure 25:
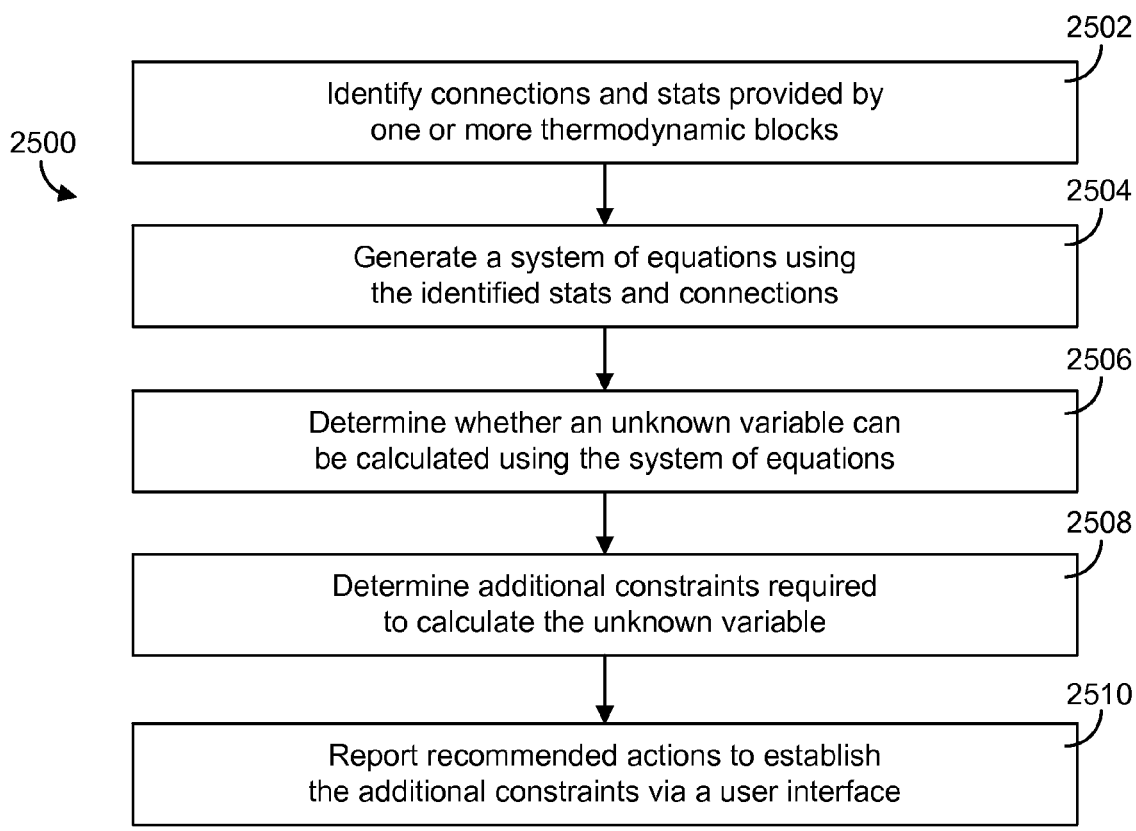
FIG. 25 is a flowchart of a process which may be performed by the solver module of FIG. 19 to analyze a thermodynamic model and recommend improvements to a user, according to an exemplary embodiment.

Referring now to FIG. 25, a flowchart of a process 2500 for analyzing and recommending improvements to a thermodynamic model is shown, according to an exemplary embodiment. Process 2500 may be performed by a controller or other supervisory device in a building management system to identify one or more improvements that could be made to the thermodynamic model to enhance the capabilities of the model. Process 2500 is shown to include identifying connections and stats provided by one or more thermodynamic blocks (step 2502). The connections and stats identified in step 2502 may be defined as attributes of a thermodynamic block (e.g., connections 918 and stats 920) and/or as attributes of a sub-block encompassed by the thermodynamic block.

Process 2500 is shown to include generating a system of equations using the identified stats and connections (step 2504). The system of equations may include equations that define relationships between thermodynamic blocks based on the connections. The system of equations may also include equations that define relationships between the inputs and outputs of a thermodynamic block based on the stats. Some of the variables in the system of equations may have known values. For example, some of the variables may be measured by a sensor, specified as a constant parameter, and/or provided as an internal data point. Other variables in the system of equations may have unknown values.

Process 2500 is shown to include determining whether an unknown variable can be calculated using the system of equations (step 2506). Step 2506 may include determining whether sufficient constraints exist within the thermodynamic model to limit the unknown variable to a particular calculable value (e.g., based on one or more known values). Constraints may include the stats and connections that define relationships between variables in the system of equations generated in step 2504. If sufficient constraints exist, the unknown variable can be calculated as described with reference to process 2400. However, if the unknown variable cannot be calculated using the system of equations (i.e., the unknown variable is not fully constrained), process 2500 may proceed to step 2508.

Process 2500 is shown to include determining one or more additional constraints required to calculate the unknown variable (step 2508). Step 2508 may be performed in response to a determination in step 2506 that additional constraints are necessary to fully constrain the unknown variable to a particular value. In some embodiments, step 2508 includes identifying one or more unknown variables that, if known (e.g., measured, specified, etc.), would allow the unknown variable to be calculated. In some embodiments, step 2508 includes identifying one or more potential connections between thermodynamic blocks that, if formed, would constrain the unknown variable to a particular value.

Process 2500 is shown to include reporting recommended actions to establish the additional constraints via a user interface (step 2510). In some embodiments, the recommended actions include actions that could be performed by a user to provide the additional definition needed to solve for the unknown variable (e.g., defining a data point, defining a connection, etc.). Defining a data point may include installing a sensor to measure the data point or defining a stat to calculate the data point. Defining a connection may include establishing or fully defining a link between two or more thermodynamic blocks in the model.

In some embodiments, step 2510 includes generating and/or providing the user with a cost-benefit analysis of adding additional complexity to the model. For example, step 2510 may include presenting the user with a list of sensors that could be added and/or connections that could be defined to provide additional functionality to the system model. The list may include an estimated cost of each sensor and/or connection that could be added. Step 2510 may include reporting the costs and benefits of various actions that would add more definition to the system model. For example, step 2510 may include reporting that if the user spends X more dollars adding a sensor or further configuring the data model, the model will then be capable of providing feature Y. This allows the user to pick and choose features in a plug-and-play manner by assessing the costs and benefits of additional model definition.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A building management system (BMS) comprising:
one or more sensors that measure a variable state or condition in the building management system; and
a plurality of BMS devices that operate to affect the variable state or condition measured by the one or more sensors, wherein each of the BMS devices stores a thermodynamic block that models the BMS device;
wherein each of the thermodynamic blocks comprises a list of connections that define one or more inputs to the thermodynamic block and one or more outputs from the thermodynamic block a list of stats that define one or more relationships between the inputs and the outputs;
wherein each of the BMS devices comprises a solver configured to perform calculations using the stats and connections defined by the thermodynamic block stored within the BMS device.

2. The building management system of claim 1, wherein the plurality of BMS devices comprise:
a plurality of atomic BMS devices comprising lowest level equipment in the building management system; and
a controller that operates to control a subsystem comprising the plurality of atomic BMS devices.

3. The building management system of claim 2, wherein:
each of the atomic BMS devices stores an atomic thermodynamic block that represents the atomic BMS device and models a performance of the atomic BMS device; and
the controller stores a non-atomic thermodynamic block that represents the subsystem comprising the plurality of atomic BMS devices and models a performance of the subsystem.

4. The building management system of claim 3, wherein:
the non-atomic thermodynamic block encompasses each of the atomic thermodynamic blocks; and
the controller is configured to calculate an output from the non-atomic thermodynamic block by summing one or more outputs from the atomic thermodynamic blocks.

5. The building management system of claim 3, wherein:
the controller is configured to request the atomic thermodynamic blocks from the plurality of atomic BMS devices;
the plurality of atomic BMS devices are configured to send the atomic thermodynamic blocks to the controller in response to the request; and
the controller is configured to update the non-atomic thermodynamic block stored within the controller using the atomic thermodynamic blocks received from the plurality of atomic BMS devices.

6. The building management system of claim 1, wherein the solver is configured to:
access the list of connections and the list of stats provided by a thermodynamic block;
identify one or more time series data inputs defined by the list of connections, wherein the time series data inputs are measured by the one or more sensors;
identify one or more functions that use the identified time series data inputs, wherein the functions are defined by the list of stats; and
calculate one or more virtual data points not measured by the one or more sensors by applying the identified functions to the identified time series data inputs.

7. The building management system of claim 1, wherein the solver is configured to:
access the list of connections and the list of stats provided by a thermodynamic block;
identify one or more data inputs defined by the list of connections, wherein the identified data inputs are projected future data inputs;
identify one or more functions, defined by the list of stats, that use the projected future data inputs; and
simulate a future performance of the building management system by applying the identified functions to projected future data inputs.

8. The building management system of claim 1, wherein the solver is configured to:
identify one or more sub-blocks encompassed by a non-atomic thermodynamic block;
retrieve, from the one or more identified sub-blocks, the connections and the stats provided by the one or more identified sub-blocks;
generate a system of equations using the retrieved connections and stats; and
solve the system of equations to calculate one or more unknown values not measured by the one or more sensors.

9. The building management system of claim 1, wherein the solver is configured to:
identify the connections and the stats provided by one or more of the thermodynamic blocks;
generate a system of equations using the identified connections and stats, the system of equations comprising a plurality of variables;
determine, for each of the plurality of variables with an unknown value, whether the unknown value can be calculated using the system of equations based on one or more of the plurality of variables with a known value; and
in response to a determination that the unknown value cannot be calculated using the system of equations, determine one or more additional constraints required to calculate the unknown value.

10. The building management system of claim 9, wherein the solver is configured to generate a user interface comprising:
   the one or more additional constraints required to calculate the unknown value; and
   a recommended action to establish the one or more additional constraints.

11. The building management system of claim 10, wherein the recommended action comprises at least one of:
   installing a new sensor to measure a variable with an unknown value; and
   defining a new connection between thermodynamic blocks.

12. A building management system (BMS) comprising:
   one or more sensors that measure a variable state or condition in the building management system;
   a plurality of atomic BMS devices that operate to affect the variable state or condition measured by the one or more sensors, wherein each of the atomic BMS devices stores an atomic thermodynamic model that represents the atomic BMS device and models a performance of the atomic BMS device;
   a controller that operates to control a subsystem comprising the plurality of atomic BMS devices, wherein the controller stores a non-atomic thermodynamic model that represents the subsystem and models a performance of the subsystem;
   wherein each of the thermodynamic models comprises a list of connections that define one or more connections to other thermodynamic models and a list of stats that define one or more calculations based on the connections.

13. The building management system of claim 12, wherein:
   the thermodynamic models comprise a first thermodynamic model representing a first thermodynamic system and a second thermodynamic model representing a second thermodynamic system; and
   the connections to other thermodynamic models represent an output from the first thermodynamic system that is provided as an input to the second thermodynamic system.

14. The building management system of claim 12, further comprising a connections database that stores a plurality of connection objects, wherein each of the connection objects corresponds to a connection listed in at least one of the thermodynamic models and defines attributes of the corresponding connection.

15. The building management system of claim 12, wherein:
   the connections define one or more inputs to the thermodynamic model and one or more outputs of the thermodynamic model; and
   the stats define one or more relationships between the inputs and the outputs.

16. The building management system of claim 12, further comprising a stats database that stores a plurality of stat objects, wherein each of the stat objects corresponds to a stat listed in at least one of the thermodynamic models and defines functional relationships between inputs and outputs of the thermodynamic model.

17. The building management system of claim 12, wherein:
   the controller is configured to request the atomic thermodynamic models from the plurality of atomic BMS devices;
   the plurality of atomic BMS devices are configured to send the atomic thermodynamic models to the controller in response to the request; and
   the controller is configured to update the non-atomic thermodynamic model stored within the controller using the atomic thermodynamic models received from the plurality of atomic BMS devices.

18. The building management system of claim 12, wherein each of the BMS devices comprises a solver configured to perform calculations using the stats and connections defined by the thermodynamic model stored within the BMS device.

19. The building management system of claim 18, wherein the solver is configured to:
   access the list of connections and the list of stats provided by a thermodynamic model;
   identify one or more time series data inputs defined by the list of connections, wherein the time series data inputs are measured by the one or more sensors;
   identify one or more functions that use the identified time series data inputs, wherein the functions are defined by the list of stats; and
   calculate one or more virtual data points not measured by the one or more sensors by applying the identified functions to the identified time series data inputs.

20. The building management system of claim 18, wherein the solver is configured to:
   identify the connections and the stats provided by one or more of the thermodynamic models;
   generate a system of equations using the identified connections and stats, the system of equations comprising a plurality of variables;
   determine, for each of the plurality of variables with an unknown value, whether the unknown value can be calculated using the system of equations based on one or more of the plurality of variables with a known value;
   in response to a determination that the unknown value cannot be calculated using the system of equations, determine one or more additional constraints required to calculate the unknown value; and
   generate a report for presentation to a user via a user interface of the building management system, the report comprising a recommended action to establish the one or more additional constraints.

* * * * *